United States Patent
Segar

(10) Patent No.: US 12,357,039 B2
(45) Date of Patent: Jul. 15, 2025

(54) RAW CUT EDGE SWIMSUIT, AND METHODS OF MAKING AND USING THE SAME

(71) Applicant: Hayley E Segar, Milford, CT (US)

(72) Inventor: Hayley E Segar, Milford, CT (US)

(73) Assignee: ELEVEN18 LLC, Old Saybrook, CT (US)

( * ) Notice: Subject to any disclaimer, the term of this patent is extended or adjusted under 35 U.S.C. 154(b) by 21 days.

(21) Appl. No.: 17/689,306

(22) Filed: Mar. 8, 2022

(65) Prior Publication Data

US 2022/0287391 A1    Sep. 15, 2022

Related U.S. Application Data

(60) Provisional application No. 63/158,840, filed on Mar. 9, 2021.

(51) Int. Cl.
| | | |
|---|---|---|
| A41D 7/00 | (2006.01) | |
| A41D 27/24 | (2006.01) | |
| A41D 31/02 | (2019.01) | |
| A41D 31/04 | (2019.01) | |

(52) U.S. Cl.
CPC .............. *A41D 7/00* (2013.01); *A41D 27/245* (2013.01); *A41D 31/02* (2013.01); *A41D 31/04* (2019.02); *A41D 2300/52* (2013.01)

(58) Field of Classification Search
CPC .......... A41D 7/00; A41D 7/001; A41D 7/005; A41D 27/245; A41D 31/02; A41D 31/04; A41D 2300/52; A41B 9/00
See application file for complete search history.

(56) References Cited

U.S. PATENT DOCUMENTS 5,033,116 A  *  7/1991  Itagaki ..................... A41D 7/00
                                                                441/55
5,052,053 A  *  10/1991 Peart ...................... A41D 31/065
                                                                2/2.16

(Continued)

OTHER PUBLICATIONS

Niidor, Adhesive Bra Strapless Sticky Invisible Push-up Silicone Bra for Backless Dress with Nipple Covers Nude, May 6, 2021, 9 pages, Amazon, https://www.amazon.com/Niidor-Adhes.

(Continued)

*Primary Examiner* — Uyen T Nguyen
(74) *Attorney, Agent, or Firm* — UConn IP Law Clinic; Emily Tkac; Jack Hayes

(57) ABSTRACT

A swimsuit is disclosed herein comprising a bust portion, and a bottom portion including a waist portion configured to surround a torso, with an inner fabric layer including an interior surface and an exterior surface, and an outer fabric layer including an interior surface and an exterior surface, a left leg opening defined by a lower left edge portion, and a right leg opening defined by a lower right edge portion. The lower left edge portion and lower right edge portion are raw cut and are bonded with a bonding layer between the interior surface of the inner layer and the interior surface of the exterior layer. A first positioning strip is formed on the exterior surface of the inner fabric layer along an edge portion of at least one of the bust portion and the bottom portion. Corresponding methods also are disclosed.

17 Claims, 20 Drawing Sheets

(56) References Cited

U.S. PATENT DOCUMENTS

| | | | | |
|---|---|---|---|---|
| 5,155,867 | A * | 10/1992 | Norvell | B32B 27/12 |
| | | | | 2/113 |
| 5,586,340 | A | 12/1996 | Russo | |
| 5,603,116 | A * | 2/1997 | Tronc | B63C 11/04 |
| | | | | 2/161.1 |
| 5,742,936 | A * | 4/1998 | Tronc | A41D 13/012 |
| | | | | 2/161.1 |
| 5,996,120 | A | 12/1999 | Balit | |
| 6,223,351 | B1 | 5/2001 | Marie | |
| 6,277,106 | B1 * | 8/2001 | Boudry | A61F 13/58 |
| | | | | 604/385.03 |
| 6,446,268 | B1 * | 9/2002 | Lazarian | A41F 9/00 |
| | | | | 427/256 |
| 6,645,188 | B2 * | 11/2003 | Kusibojoska | A61F 13/622 |
| | | | | 604/392 |
| 7,814,569 | B2 | 10/2010 | Di Lorenzo | |
| 7,854,022 | B2 | 12/2010 | Warren et al. | |
| 7,882,569 | B2 | 2/2011 | Liu | |
| 8,117,674 | B2 | 2/2012 | Warren et al. | |
| 8,196,220 | B2 | 6/2012 | Rance et al. | |
| 8,286,262 | B2 | 10/2012 | Rance et al. | |
| 8,332,962 | B1 * | 12/2012 | Machado | C09J 7/24 |
| | | | | 2/2.15 |
| 8,398,453 | B2 | 3/2013 | Mitchell et al. | |
| 8,870,843 | B2 * | 10/2014 | Dougherty, Jr. | A61F 13/64 |
| | | | | 604/389 |
| 9,095,176 | B2 | 8/2015 | Roberts et al. | |
| 9,220,305 | B2 | 12/2015 | Hersh | |
| 9,687,395 | B2 * | 6/2017 | Clarke | A41D 31/125 |
| 9,717,289 | B1 * | 8/2017 | Fooden | A41D 7/00 |
| 9,980,524 | B2 | 5/2018 | Gallagher | |
| 10,123,575 | B2 * | 11/2018 | Funk-Danielson | A41C 3/0057 |
| 10,368,587 | B2 | 8/2019 | Oliver | |
| 10,631,583 | B2 | 4/2020 | Musciacchio | |
| 10,813,390 | B2 | 10/2020 | Joseph | |
| 10,905,176 | B2 | 2/2021 | Musciacchio | |
| 10,959,465 | B2 | 3/2021 | Melendez et al. | |
| D917,830 | S | 5/2021 | Thomson | |
| D931,573 | S | 9/2021 | Lightfoot | |
| 2003/0138586 | A1 * | 7/2003 | Fowler | B29C 65/5085 |
| | | | | 428/102 |
| 2005/0000622 | A1 * | 1/2005 | Cano | B29C 66/43 |
| | | | | 156/308.4 |
| 2006/0154053 | A1 * | 7/2006 | Cain | B32B 25/20 |
| | | | | 428/355 R |
| 2007/0054081 | A1 * | 3/2007 | DeMarco | A41C 3/065 |
| | | | | 428/40.1 |
| 2007/0141940 | A1 * | 6/2007 | Baychar | D04H 13/001 |
| | | | | 442/337 |
| 2009/0181599 | A1 * | 7/2009 | Farmer | A41D 13/012 |
| | | | | 450/86 |
| 2011/0016607 | A1 * | 1/2011 | Ashmore | A41B 11/126 |
| | | | | 450/94 |
| 2012/0157951 | A1 * | 6/2012 | Johnson | A41D 27/12 |
| | | | | 604/368 |
| 2012/0266347 | A1 * | 10/2012 | DiLorenzo | A41D 7/00 |
| | | | | 450/95 |
| 2013/0219579 | A1 * | 8/2013 | Molyneux | A41D 13/012 |
| | | | | 2/2.15 |
| 2013/0255103 | A1 * | 10/2013 | Dua | A43B 23/025 |
| | | | | 428/57 |
| 2016/0015089 | A1 * | 1/2016 | Palese | A41D 1/21 |
| | | | | 450/156 |
| 2017/0002234 | A1 * | 1/2017 | Martin | B32B 7/12 |
| 2017/0360117 | A1 * | 12/2017 | Wilds | A41B 13/005 |
| 2019/0350269 | A1 * | 11/2019 | DeSimone | A41B 7/00 |
| 2019/0364999 | A1 * | 12/2019 | Baschak | A41F 17/00 |
| 2020/0022424 | A1 * | 1/2020 | Wenzel | B32B 5/024 |
| 2020/0397064 | A1 * | 12/2020 | Liu | B32B 7/08 |
| 2021/0093029 | A1 * | 4/2021 | Gallagher | B29C 65/72 |
| 2021/0177068 | A1 * | 6/2021 | Karabetyan | A41B 9/023 |
| 2022/0071310 | A1 * | 3/2022 | Xu | A41C 5/00 |
| 2022/0183411 | A1 * | 6/2022 | Thammasouk | A41D 27/10 |

OTHER PUBLICATIONS

Victoria's Secret Pink, Loungin' Scoop Bra, May 6, 2021, 6 pages, https://www.victoriassecret.com/us/pink/bras-catalog/pink-loungin-scoop-bra-1118201100.

Nike, Women's Onyx Flash Bonded Cut-Out One Piece Swimsuit, May 6, 2021, 7 pages, Dicks, https://www.dickssportinggoods.com/p/nike-womens-onyx-flash-bonded-cut-out-one-piece-swim.

True & Co, Trube Body Boost Bra, May 6, 2021, 5 Pages, https://trueandco.com/product/bras/wireless/true-body-boost-bra/.

Commando, Women's Classic Solid Thong, May 6, 2021, 8 pages, https://www.wearcommando.com/collections/womens-intimates-bottoms/products/thongvariant=42069269255.

Spanx, Core High Rise Bottom Swimwear, May 6, 2021, 7 pages, Amazon, https://www.amazon.com/SPANX-Core-High-Bottom-Swimwear/dp/B07DVVD9SP.

Body Glove, Sunrise Korcula, May 6, 2021, 4 pages, Popina, https://www.popinaswimwear.com/body-glove-sunrise-korcula-neo-mint.html.

Locked Swim, Non-slip Bathing Suits, Oct. 13, 2022, 38 pages, https://www.lockedswim.com/.

Locked Swim, First Instagram Post, Jun. 28, 2021, 1 page, https://www.instagram.com/p/CQrckMtFTmq/?hl=en.

* cited by examiner

RAW CUT EDGE SWIMSUIT, AND METHODS OF MAKING AND USING THE SAME

CROSS-REFERENCE TO RELATED APPLICATIONS

This application claims the benefit of U.S. Provisional Patent Application No. 63/158,840 filed Mar. 9, 2021, the contents of which are incorporated by reference herein in their entirety.

BACKGROUND

This disclosure relates generally to swimsuits and more particularly to women's swimsuits.

Swimsuits typically have features including compressing seams, edges with folded, stitched fabric that may include an elastic layer, resulting in an unflattering design. It is problematic when a swimsuit creates unflattering indentations in the skin.

It would be useful to develop flattering swimsuits that will not create indents in the skin.

SUMMARY

One embodiment described herein is a swimsuit comprising a bust portion, a bottom portion, including a waist portion configured to surround a torso, with an inner fabric layer including an interior surface and an exterior surface, and an outer fabric layer including an interior surface and an exterior surface, a left leg opening defined by a lower left edge portion, and a right leg opening defined by a lower right edge portion, the lower left edge portion and lower right edge portion being raw cut and being bonded with a bonding layer between the interior surface of the inner layer and the interior surface of the exterior layer, and a first positioning strip formed on the exterior surface of the inner fabric layer along an edge portion of at least one of the bust portion and the bottom portion.

Another embodiment described herein is a one-piece swimsuit comprising a bust portion, a bottom portion connected to the bust portion, the bottom portion including a waist portion configured to surround a torso, with an inner fabric layer including an interior surface and exterior surface, and an outer fabric layer including an interior surface and an exterior surface, a left leg opening defined by a lower left edge portion, and a right leg opening defined by a lower right edge portion, the lower left edge portion and lower right edge portion being raw cut and being bonded with a bonding layer between the interior surface of the inner layer and the interior surface of the exterior layer, and a first positioning strip formed on the exterior surface of the inner fabric layer along an edge of at least one of the bust portion and the bottom portion.

A further embodiment is a method of making a swimsuit, comprising obtaining a first fabric for use in forming the inner layer of the swimsuit and a second fabric for use in forming the outer layer of the swimsuit, raw cutting the first fabric and the second fabric to the appropriate size and shape for a swimsuit, forming raw cut edges, bonding the first fabric to the second fabric with an adhesive along the raw cut edges, and forming a positioning strip along an exterior side of the inner layer of at least one of the raw cut edges, the positioning strip being configured to contact a wearer's skin.

Another embodiment disclosed herein is a one-piece swimsuit comprising an inner layer of fabric, and an outer layer of fabric, a neck edge portion with an inner-side surface and an outer-side surface, a left arm opening defined by an upper left edge portion, a right arm opening defined by an upper right edge portion, a left leg opening defined by a lower left edge portion, and a right leg opening defined by a lower right edge portion, and a first positioning strip formed on the inner surface of at least one of the edge portions.

Yet another embodiment is a two-piece swimsuit comprising a top portion, a bottom portion, including a waist edge portion configured to surround a torso, with an inner-side surface and an outer-side surface, and a left leg opening, defined by a lower left edge portion, and a right leg opening, defined by a lower right edge portion, at least one of the top portion and the bottom portion including an inner layer of fabric and an outer layer of fabric, and a first frictional strip formed on the inner surface of the bottom portion.

A further embodiment is a one-piece swimsuit comprising an inner layer of fabric, and an outer layer of fabric, a neck edge portion with an inner-side surface and an outer-side surface, a left arm opening defined by an upper left edge portion, a right arm opening defined by an upper right edge portion, a left leg opening defined by a lower left edge portion, a right leg opening defined by a lower right edge portion, and a first frictional strip formed on the inner surface of at least one of the edge portions.

DETAILED DESCRIPTION

Figure 1:
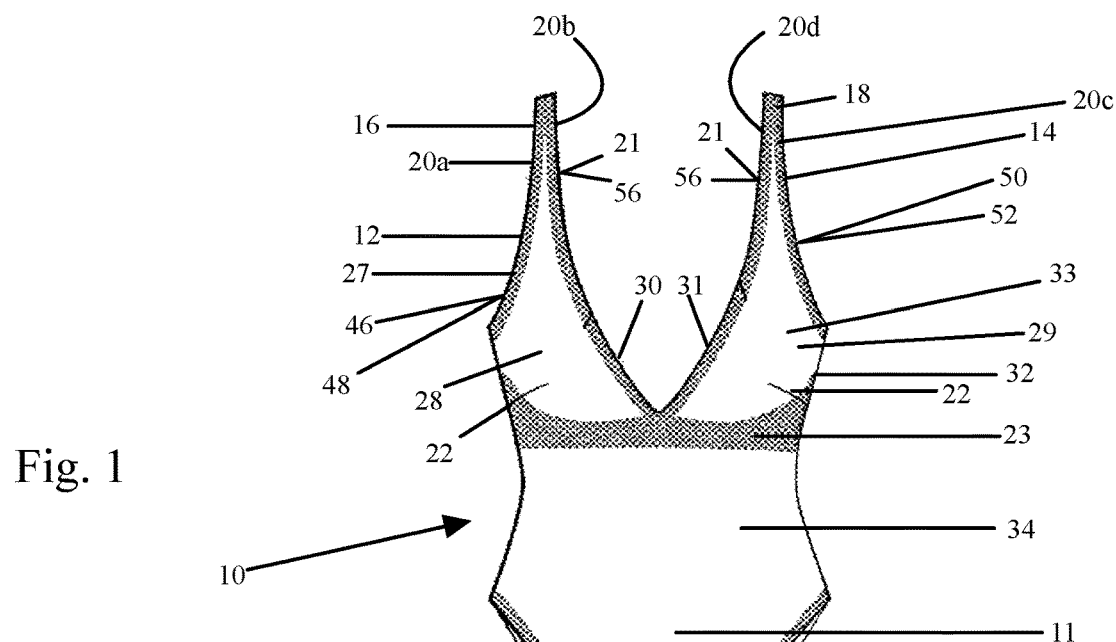
FIG. 1 shows a front, right-side-out view of a first embodiment.

Traditional swimsuits can create unflattering indents due to fabrication, compression, seams, stitched edges, and overall design. In order to overcome this, the embodiments disclosed herein are directed to swimsuits with raw cut edges to sit perfectly atop the skin to create a more flattering fit. The embodiments have bonding instead of compressing elastic. This reduces unflattering indents in the skin caused by elastic. Instead, the bonded fabric lays flat on the skin and adds structure and integrity to the embodiments. The swimsuits also have raw cut edges instead of tight seams, folded edges, and stitching that can squeeze the skin and lead to unflattering fits. Positioning strips are also added to the inner edges to assist in the raw cut edges clinging to the skin without creating unflattering indentations upon a wearer's body. The swimsuit's edges touching a wearer's skin lie flat against the skin, and do not produce bumps where the fabric meets the skin. The edge portions of the swimsuit are seamless.

As used herein, the term "bonding layer" means an adhesive layer that connects two separate fabric layers together. The bonding layer can be a continuous layer or a non-continuous layer. As used herein, "hole" and "opening" have the same meaning. The terms "frictional strip" and "positioning strip" have the same meaning in this document.

In embodiments, the swimsuit has a bust portion and a bottom portion. The bust portion includes a left shoulder strap, a right shoulder strap, a central portion, and a lower end portion. The bust portion has an inner fabric layer including an interior surface and exterior surface, and an outer fabric layer including an interior surface and an exterior surface. The left shoulder strap and central portion define a left arm opening, and the right shoulder strap and central portion define a right arm opening. The two layers of fabric are bonded together using an adhesive applied between the inner and outer layer of fabric. The bust portion has a bonding layer between the interior surface of the inner layer and the interior surface of the exterior layer at the lower end of the bust portion. The right and left arm holes have bonding at the edges. In embodiments, the right and left shoulder straps have positioning strips on the edges of the exterior surface of the inner fabric layer to help position the fabric on the skin. The positioning strips are formed from a semi-tacky thermoplastic or thermoset material. In some cases, the neckline has a positioning strip on the edge portion of the exterior surface of the inner layer of fabric that contacts the wearer's skin.

The bottom portion may be connected to the bust portion of the swimsuit, or may be a separate piece. The bottom portion includes a waist portion configured to surround a torso, with an inner fabric layer including an interior surface and exterior surface, and an outer fabric layer including an interior surface and an exterior surface, a left leg opening defined by a lower left edge portion, and a right leg opening defined by a lower right edge portion, the lower left edge portion and lower right edge portion being raw cut and being bonded with a bonding layer between the interior surface of the inner layer and the interior surface of the exterior layer. Positioning strips are formed on the edges of the exterior surface of inner fabric layer on the right leg opening and on the left leg opening.

In some cases, the swimsuit is a one-piece swimsuit. In other cases, the swimsuit is a two-piece swimsuit. The waist portion of the two-piece swimsuit includes a waist edge portion, and wherein a positioning strip is attached to the inner side surface of the waist edge portion of the bottom portion. In embodiments, the waist edge portion is seamless and does not contain any elastic or sewn band. The waist edge portion may be bonded.

The positioning strips may have a temporary backing that sticks to the positioning strips and is intended to be removed before the wearer uses the swimsuit. The backing is configured to stick to the positioning strips without the risk of falling off the positioning strips, but can be manually pulled away from the positioning strips when the swimsuit is ready for its first use. The backing keeps the positioning strips fresh and tacky for their intended use.

Figure 2:
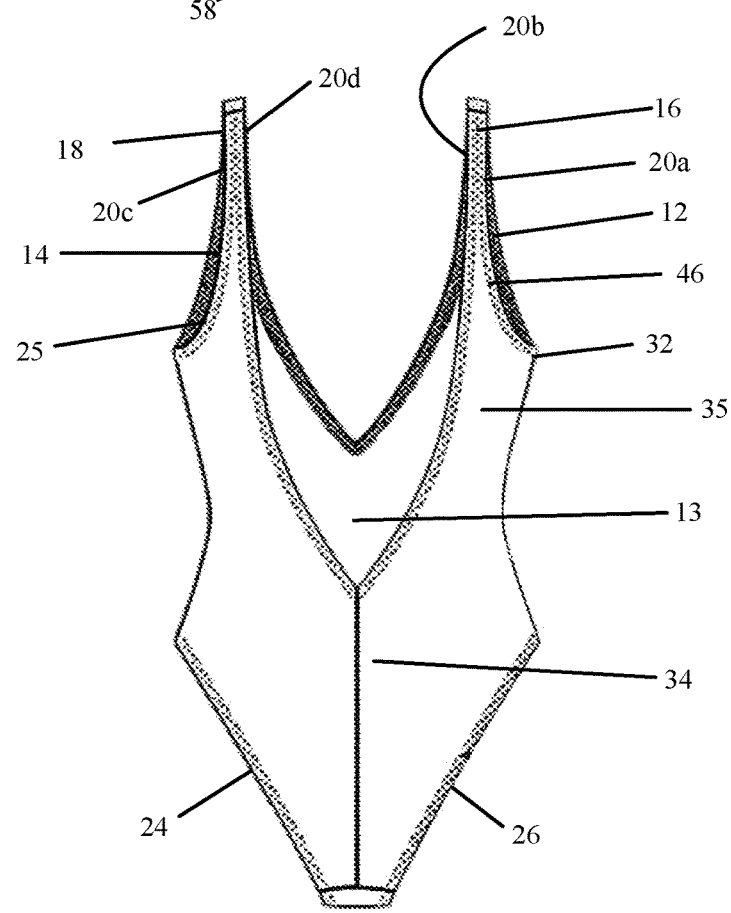
FIG. 2 shows a back, right-side-out view of the first embodiment.

Referring to the drawings, FIGS. 1 and 2 show front and back, right-side-out views of a first embodiment of a one-piece swimsuit 10. The swimsuit 10 includes an outer fabric layer 11 and a separate inner fabric layer 13. The swimsuit comprises a bust portion 32 and a torso portion 34. The bust portion 32 of the swimsuit 10 includes a right shoulder strap 16 forming a right armhole 12, a left shoulder strap 18 forming a left armhole 14, a right breast cup 28, a left breast cup 29, and dart-shaped stitching 22 in the lower portion of the right breast cup 28 and the left breast cup 29. The right shoulder strap 16 includes intermediate bonding layers 20a and 20b that connect the interior surface 25 of the inner fabric layer 13 to the interior surface 27 of the outer fabric layer 11. More specifically, the bonding layer 20a completely seals and connects the edge portions 46 of the interior surface 25 of the inner fabric layer 13 to the edge portions 48 of the interior surface 27 of the outer fabric layer 11 of the right shoulder strap 16, and the right armhole 12 (see FIG. 4B). The bonding layer 20b seals and connects the edge portions 21 of the inner fabric layer 13 to the edge portions 56 of the outer fabric layer 11 of the right shoulder strap 16 to medial edge portion 30 of the right breast cup 28. The left shoulder strap 18 is lined with bonding layers 20c and 20d. The bonding layer 20c completely seals edge portions 50 of the inner fabric layer 13 to the edge portions 52 of the outer fabric layer of the left shoulder strap 18 and the left armhole 14. The bonding layer 20d seals and connects the edge portions 21 of the inner fabric layer 13 to the edge portions 56 of the outer fabric layer 11 of the left shoulder strap 18 to the medial edge portion 31 of the left breast cup 29. While the Figures schematically show the bonding layers 20a-20f in order to illustrate their locations, these layers are actually hidden from view as they are positioned between the two fabric layers. Evidence of the presence of these layers can, in some cases be detected in that the fabric has slightly higher stiffness where bonding is present, and thus the fabric is less likely to fold or buckle. In embodiments, the bonding layers 20a-20f comprise a flexible fabric-to-fabric polyurethane adhesive. Other flexible fabric-to-fabric adhesives alternatively can be used, such as polyvinyl alcohol (PVA). In some cases, the bonding layer is applied as a continuous layer. In some cases, the bonding layer is applied as a non-continuous layer, such as a series of dots, straight lines, curved lines or squares.

The torso portion 34 of the swimsuit 10 includes a right leg hole 26 and a left leg hole 24. The right leg hole 26 and the left leg hole 24 have fabric edge portions 58 that are sealed with bonding layers 20e and 20f, respectively. In the embodiment shown in FIG. 1, the bonding layers 20a-20f comprise thin adhesive layers disposed between the inner fabric layer 13 and the outer fabric layer 11, and have a different composition than the outer fabric layer 11 and the inner fabric layer 13. In embodiments, the adhesive comprises at least one of a polyurethane and a polyvinyl alcohol. While the bonding layers cannot be seen (other than in FIG. 4B) when viewing the swimsuit because they are disposed between the two fabric layers, the locations of the bonding layers are illustrated in the right-side out views of the swimsuits in FIGS. 1-2, 5-6, 9-10, 13-14, 17-18, 21-22, 25-26 and 29-30 using shading, and are shown in some of the inside-out views. In embodiments, the bonding layers 20 alternatively can be formed by melting a surface of the inner fabric layer or outer fabric layer of a suitable type of fabric and then fusing the melted surface to the other fabric layer.

In the embodiment shown in FIG. 1, an additional, internal bonding layer 23 is included along the lower section of the bust portion, not along an edge of the inner fabric layer 13 and an outer fabric layer 11. In this case, the function of the internal bonding layer 23 is to give the fabric increased stiffness relative to the unbonded sections, thereby reducing creasing and folding of the fabric at the locations with internal bonding layer 23. In the embodiment shown in FIGS. 1-2, the internal bonding layer 23 is included only on the front section 33 of the bust portion 32 and not on the back section 35 of the bust portion 32 and has a larger width at the left and right ends than in the central portion. In other embodiments, the internal bonding layer 23 is included on both the front and back sections of the bust portion.

Figure 3:
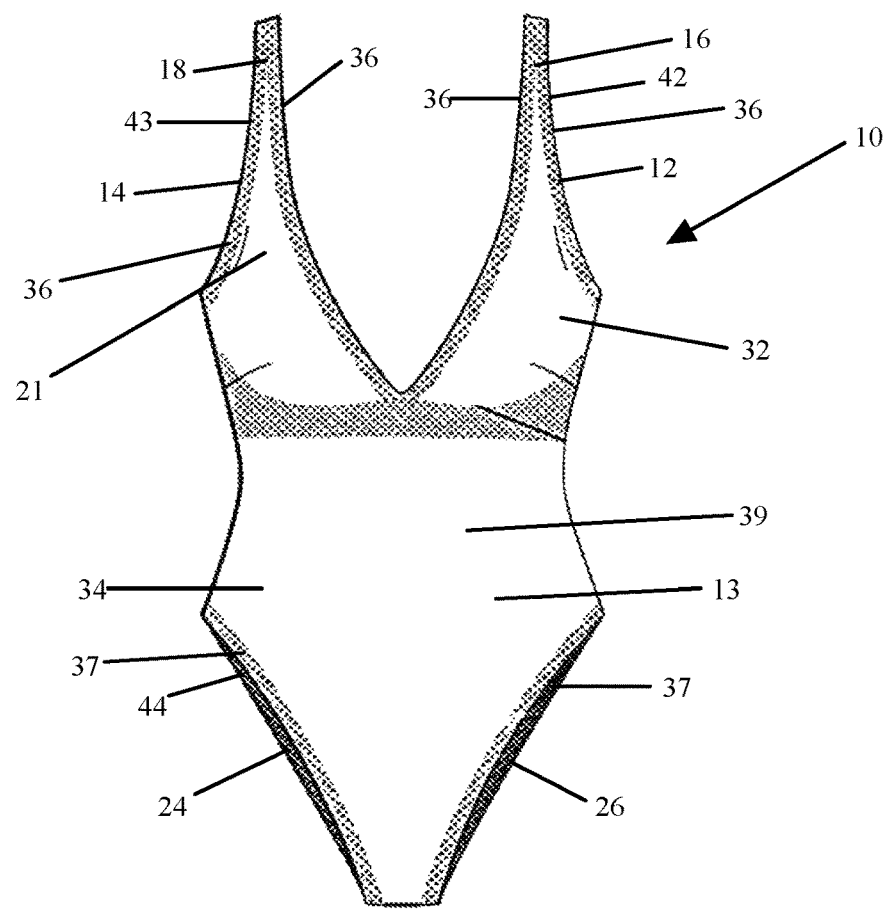
FIG. 3 shows a front, inside-out view of the first embodiment.
Figure 4A:
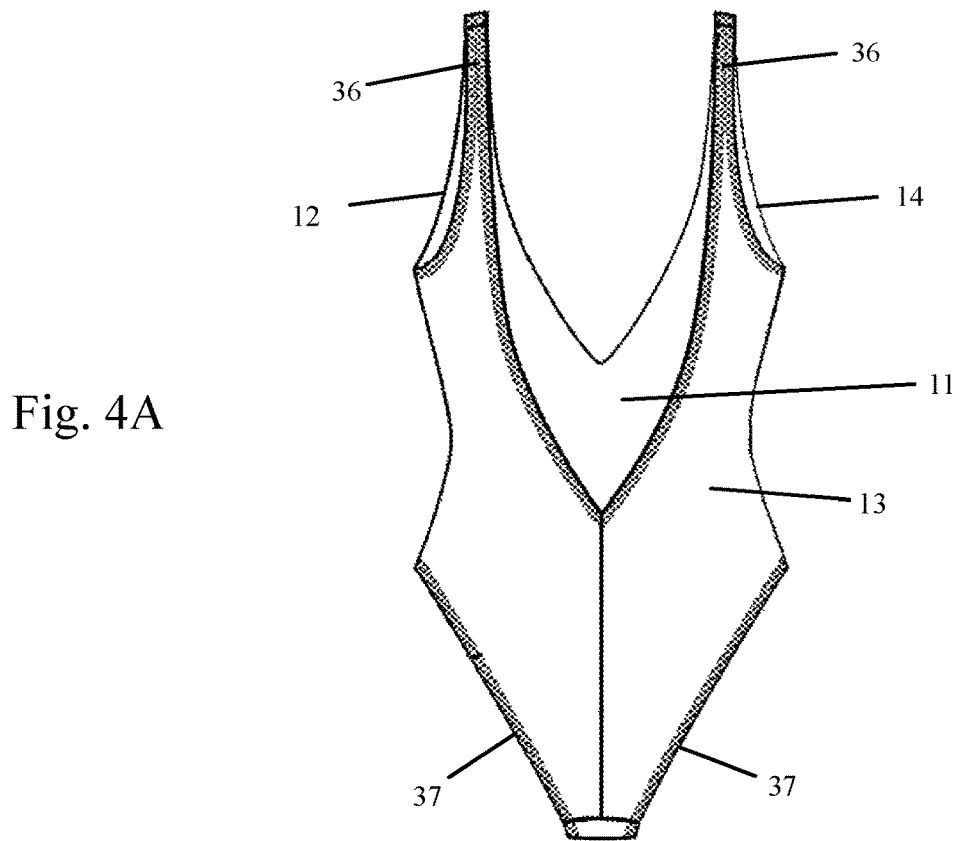
FIG. 4A shows a back, inside-out view of the first embodiment.

FIGS. 3 and 4 show front and back inside-out views of the first embodiment 10. Shoulder positioning strips 36, which may be made of silicone or another material with a similar surface tension that is comfortable when in contact with a wearer's skin, line the edge portions 42 of the fabric 21 of the right shoulder strap 16 and the right armhole 12 on the exterior surface 39 of the inner fabric layer 13. Shoulder positioning strips 36 also line the edge portions 43 of the fabric of the left shoulder strap 18 and the left armhole 14 on the exterior surface 39 the inner fabric of layer 13. Leg positioning strips 37, which may be made of silicone or another suitable material, line the edge portions 44 of the fabric 21 of the right leg hole 26 and the left leg hole 24. The shoulder positioning strips 36 are configured to contact the wearer's shoulders, keep the straps in a stationary position, and reduce the likelihood that the straps will slip off of the wearer's shoulders. However, the positioning strips 36 do not have sufficient tack that they adhere to the user's skin to a degree there would be discomfort if the straps 16, 18 are adjusted in a side-to-side manner by the wearer. The leg positioning strips 37 help the torso portion 34 of the swimsuit 10 remain in a generally stationary position on the wearer's body and reduce the likelihood that the swimsuit will ride up on the wearer's body. In the embodiments shown in FIGS. 1-4, the shoulder positioning strips 36 and leg positioning strips 37 underlie the bonded edge portions of the shoulder straps and leg holes. Other materials that can be used to form the positioning strips include, but are not limited to, latex, thermoplastic materials, including thermoplastic elastomer, and other thermoset materials that have physical properties similar to those of silicone.

Figure 4B:
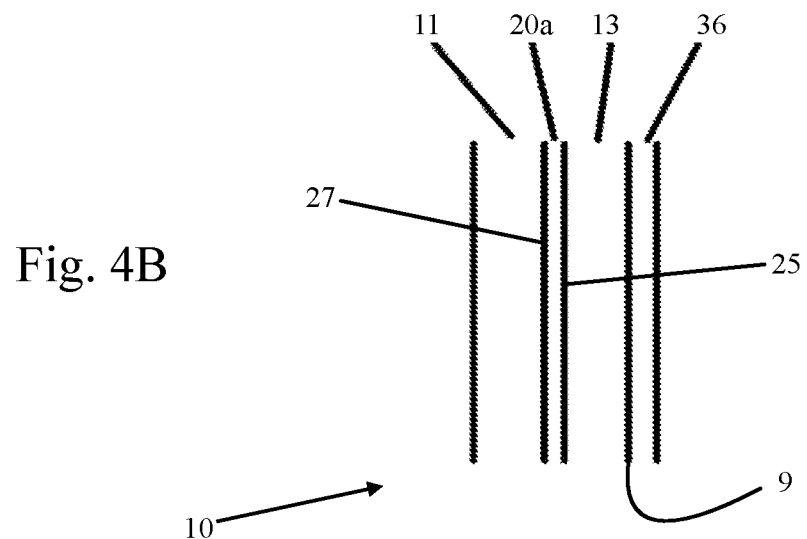
FIG. 4B shows an enlarged, schematic side view including a bonding layer and a positioning strip.

FIG. 4B shows a schematic side view of the four layers of the swimsuit 10 along one of the raw cut edges. Bonding layer 20a is situated between the outer fabric layer 11 and inner fabric layer 13 and holds the outer fabric layer 11 and inner fabric layer 13 together. The positioning strip 36 is located on the exterior surface of the inner fabric layer 13 and is configured to lay flush with the wearer's skin.

Figure 4C:
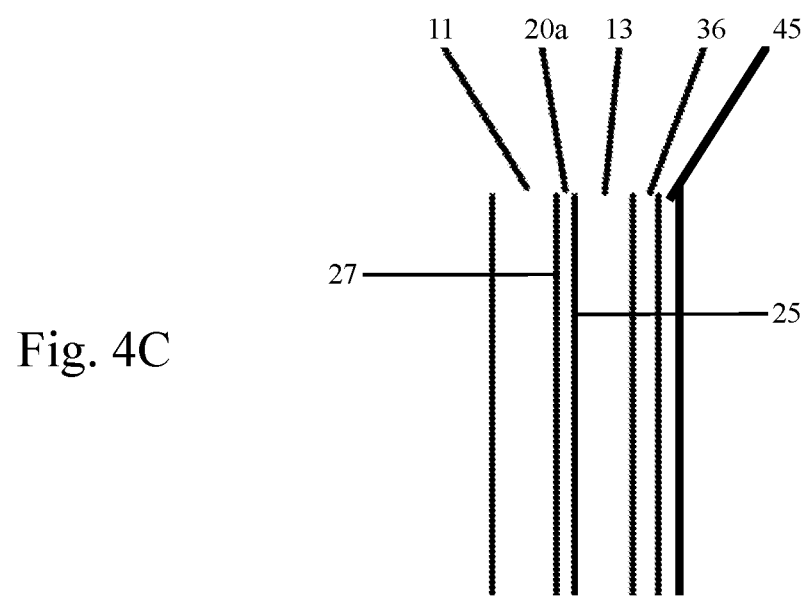
FIG. 4C shows an enlarged, schematic side view including a bonding layer, a positioning strip, and a temporary backing layer formed on the positioning strip.

FIG. 4C shows a schematic side view of the five layers of the swimsuit 10 along one of the raw cut edges, before the finished swimsuit 10 has been worn for the first time. Bonding layer 20a is situated between the outer fabric layer 11 and inner fabric layer 13 and holds the outer fabric layer 11 and inner fabric layer 13 together. The positioning strip 36 is located on the exterior surface of the inner fabric layer 13 and is configured to lay flush with the wearer's skin. A backing layer 45 is temporarily disposed on the outer side of the positioning strip and is removed before the use. The backing layer typically is form from a low surface tension thermoplastic or thermoset material such as paper or wax paper, or a thermoplastic or thermoset material having a surface tension similar to paper or wax paper, and is manually pulled away from the positioning strip, typically using the amount of forced required to remove the backing from an adhesive bandage.

Figure 5:
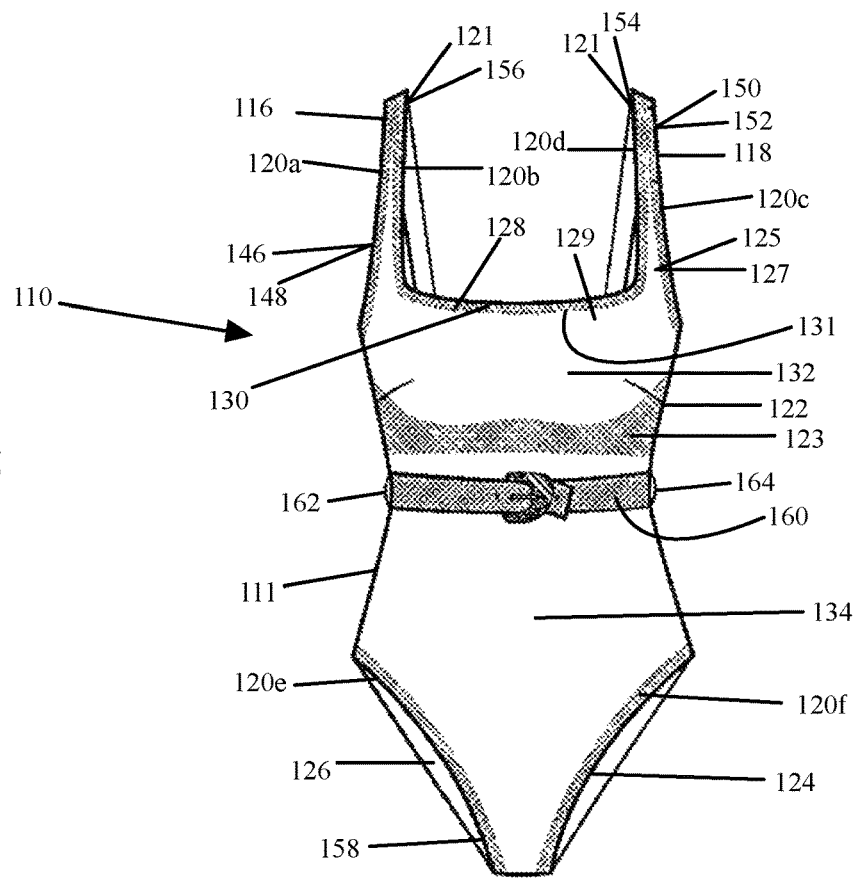
FIG. 5 shows a front, right-side-out view of a second embodiment.
Figure 6:
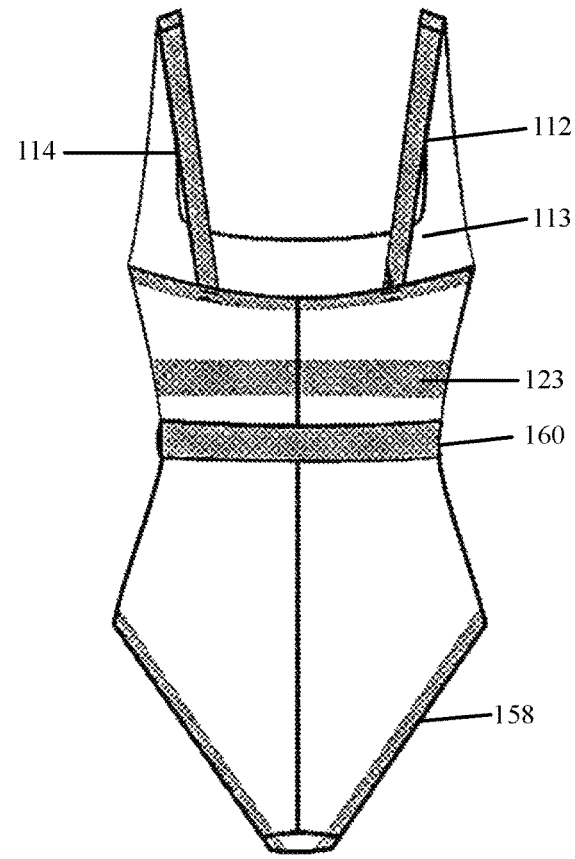
FIG. 6 shows a back, right-side-out view of the second embodiment.

FIGS. 5 and 6 show front and back right-side-out views of a second embodiment of a one-piece swimsuit 110. The swimsuit 110 includes an outer fabric layer 111 and a separate inner fabric layer 113. The swimsuit comprises a bust portion 132 and a torso portion 134. The bust portion 132 of the swimsuit 110 includes a right shoulder strap 116 forming a right armhole 112, a left shoulder strap 118 forming a left armhole 114, a right breast cup 128, a left breast cup 129, and dart-shaped stitching 122 in the lower portion of the right breast cup 128 and the left breast cup 129. The right shoulder strap 116 is lined with bonding layers 120a and 120b that connect the inner fabric layer 113 to the outer fabric layer 111. The bonding layer 120a completely seals and connects the edge portions 146 of the interior surface 125 of the inner fabric layer 113 to the edge portions 148 of the interior surface 127 of the outer fabric layer 111 of the right shoulder strap 116 and the right armhole 112. The bonding layer 120b seals and connects the edge portions 121 of the interior surface 125 of the inner fabric layer 113 to the edge portions 156 of the interior surface 127 of the outer fabric layer 111 of the right shoulder strap 116 to medial edge 130 of the right breast cup 128. The left shoulder strap 118 is lined with bonding layers 120c and 120d. The bonding layer 120c completely seals edge portions 150 of the interior surface 125 of the inner fabric layer 113 to the edge portions 152 of the interior surface 127 of the outer fabric layer of the left shoulder strap 118 and the left armhole 114. The bonding layer 120d seals and connects the edge portions 121 of the interior surface 125 of the inner fabric layer 113 to the edge portions 154 of the interior surface 127 of the outer fabric layer 111 of the left shoulder strap 118 to the medial edge 131 of the left breast cup 129. The torso portion 134 includes a right leg hole 126 and a left leg hole 124. The right leg hole 126 and the left leg hole 124 have fabric edge portions 158 that are sealed with bonding layers 120e and 120f. In the embodiment shown in FIG. 5, the bonding layers 120e and 120f are thin adhesive layers disposed between the interior surface 125 of the inner fabric layer 113 and the interior surface 127 of the outer fabric layer 111 of the right and left leg holes 126 and 128, respectively.

In the embodiment shown in FIG. 5, an additional internal bonding layer 123 is included along the lower portion of the bust portion 132. This bonding layer 123 is not along an edge of the inner fabric layer 113 and outer fabric layer 111. In this case, the function of the internal bonding layer 123 is to give the fabric increased stiffness relative to the unbonded sections, thereby reducing creasing and folding of the fabric at the locations with the internal bonding layer 123.

The swimsuit 110 optionally includes a removable belt 160 that can be positioned over the exterior surface of the outer fabric layer 111 below the bonding layer 123 that is disposed at the lower end of the bust portion 132, above the torso portion 134. The belt 160 is held in place by a right belt loop 162 and a left belt loop 164.

Figure 7:
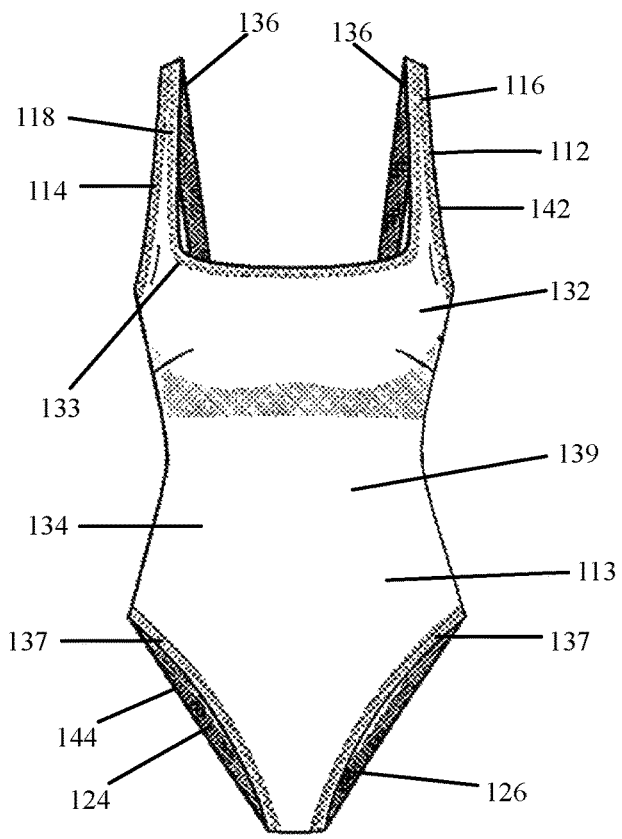
FIG. 7 shows a front, inside-out view of the second embodiment.
Figure 8:
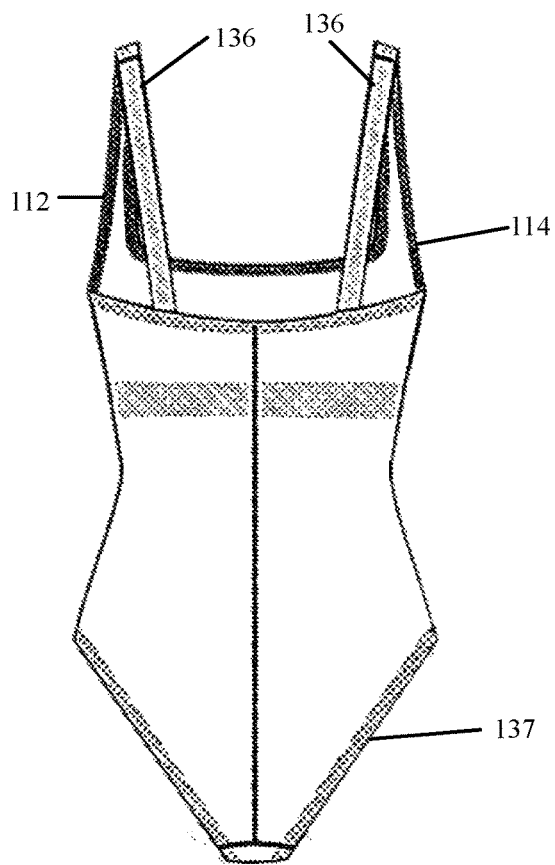
FIG. 8 shows a back, inside-out view of the second embodiment.

FIGS. 7 and 8 show front and back inside-out views of the second embodiment 110. Shoulder positioning strips 136, which may be made of silicone or another similar thermoset material, or a thermoplastic elastomer having similar properties, including surface tension and hardness, line the edge portions 142 of the fabric 121 of the right shoulder strap 116 and the right armhole 112 on the exterior surface 139 of the inner fabric layer 113. Leg positioning strips 137, which may be made of silicone or another suitable material, line the edge portions 144 of the fabric 121 of the right leg hole 126 and the left leg hole 124 in the exterior surface 139 of the inner fabric layer 113. The shoulder positioning strips 136 are configured to contact the wearer's shoulders, keep the straps in a stationary position, and reduce the likelihood that the straps will slip off of the wearer's shoulders. The leg positioning strips 137 help the torso portion 134 of the swimsuit 110 remain in a generally stationary position on the wearer's body and reduces the likelihood that the swimsuit will ride up on the wearer's body. In the embodiments shown in FIGS. 5-8, the shoulder positioning strips 136 and leg positioning strips 137 underlie the bonded raw cut edges of the shoulder straps and leg holes. Optionally a positioning strip 133 is included along the neckline on the inner fabric layer 113.

Figure 9:
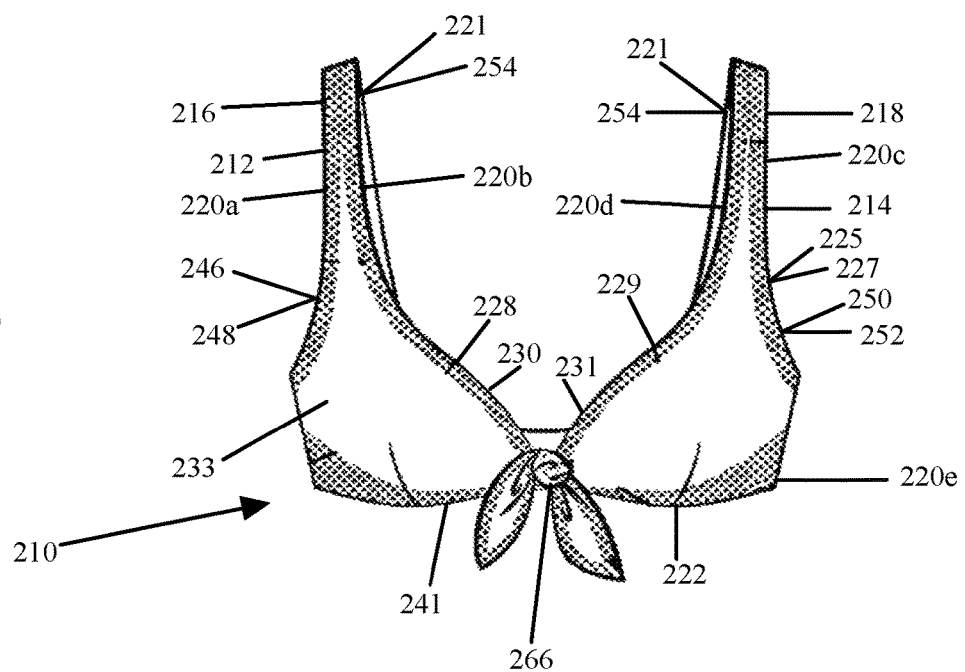
FIG. 9 shows a front, right-side-out view of a third embodiment.
Figure 10:
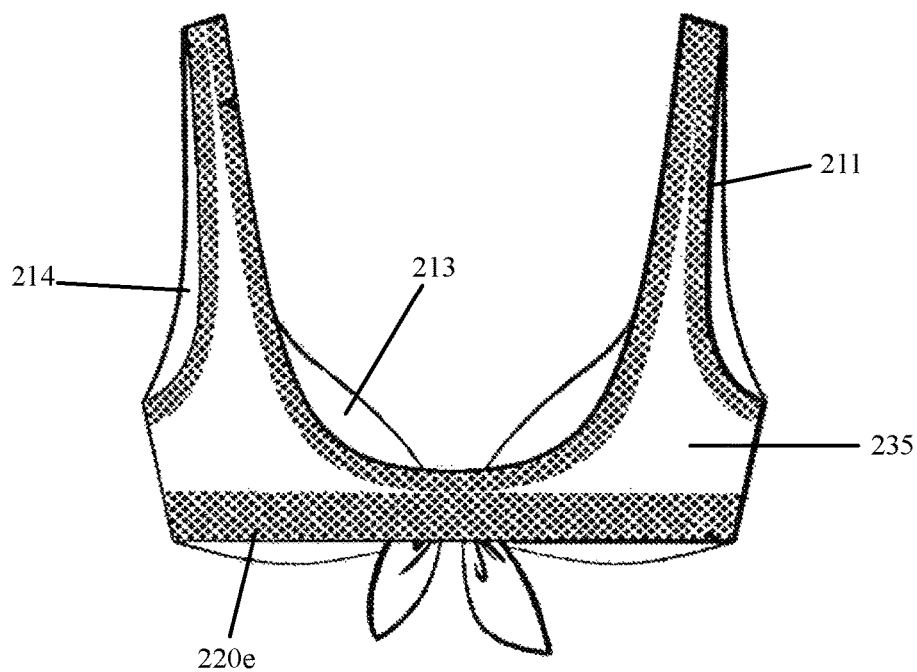
FIG. 10 shows a back, right-side-out view of the third embodiment.

FIGS. 9 and 10 show a front and back right-side-out views of a third embodiment, a bust portion of a swimsuit, designated as swimsuit 210. The swimsuit 210 is a swimsuit top for a two-piece swimsuit and includes an outer fabric layer 211 and a separate inner fabric layer 213. The swimsuit 210 includes a right shoulder strap 216 forming a right armhole 212, a left shoulder strap 218 forming a left armhole 214, a right breast cup 228, a left breast cup 229, and dart-shaped stitching 222 in the lower portion of the right breast cup 228 and the left breast cup 229. The right shoulder strap 216 is lined with bonding layers 220a and 220b that connect the interior surface 225 of the inner fabric layer 213 to the interior surface 227 of the outer fabric layer 211. The bonding layer 220a completely seals and connects the edge portions 246 of the inner fabric layer 213 to the edge portions 248 of the outer fabric layer 211 of the right shoulder strap 216 and the right armhole 212. The bonding layer 220b seals and connects the edge portions 221 of the inner fabric layer 213 to the edge portions 256 of the outer fabric layer 211 of the right shoulder strap 216 to medial edge 230 of the right breast cup 228. The left shoulder strap 218 is lined with bonding layers 220c and 220d. The bonding layer 220c completely seals edge portions 250 of the interior surface 225 of the inner fabric layer 213 to the edge portions 252 of the interior surface 227 of the outer fabric layer of the left shoulder strap 218 and the left armhole 214. The bonding layer 220d seals and connects the edge portions 221 of the interior surface 225 of the inner fabric layer 213 to the edge portions 254 of the interior surface 227 of the outer fabric layer 211 of the left shoulder strap 218 to the medial edge 231 of the left breast cup 229. The bonding layer 220e beneath the bustline on the front section 233 of the swimsuit 210 and around the back section 235 of the swimsuit 210 seals the lower edge 241 of the swimsuit 210 and gives the fabric increased stiffness relative to the unbonded sections, thereby reducing creasing and folding of the fabric at the locations with internal bonding layer 220e. The width of the bonding layer 220 on the front section 233 may be wider under the bust than along the armholes 212 and 214 and leg holes 224 and 226 to provide extra support for the fabric beneath the bust. The swimsuit 210 includes a decorative tie 266 that fastens the right breast cup 228 to the left breast cup 229 along the medial line 228.

Figure 11:
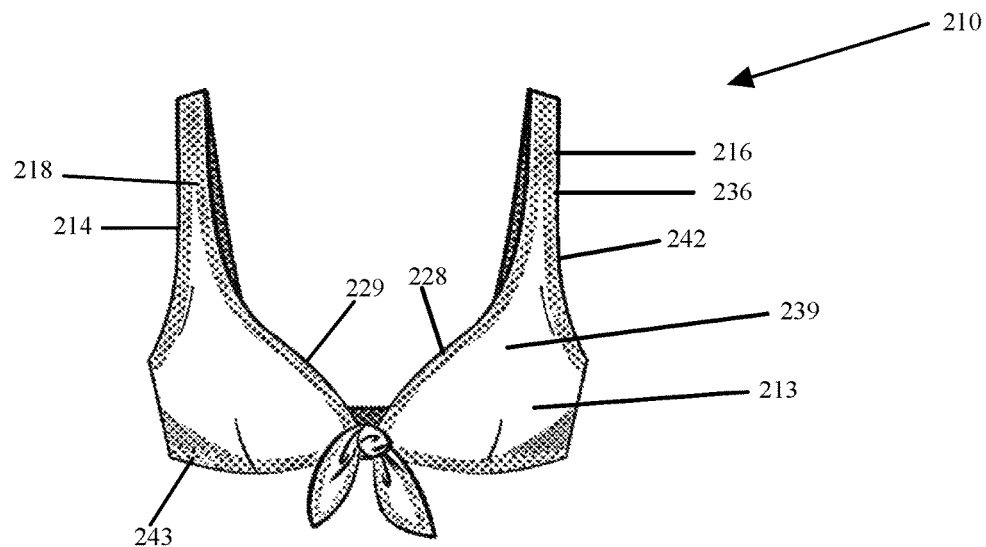
FIG. 11 shows a front, inside-out view of the third embodiment.
Figure 12:
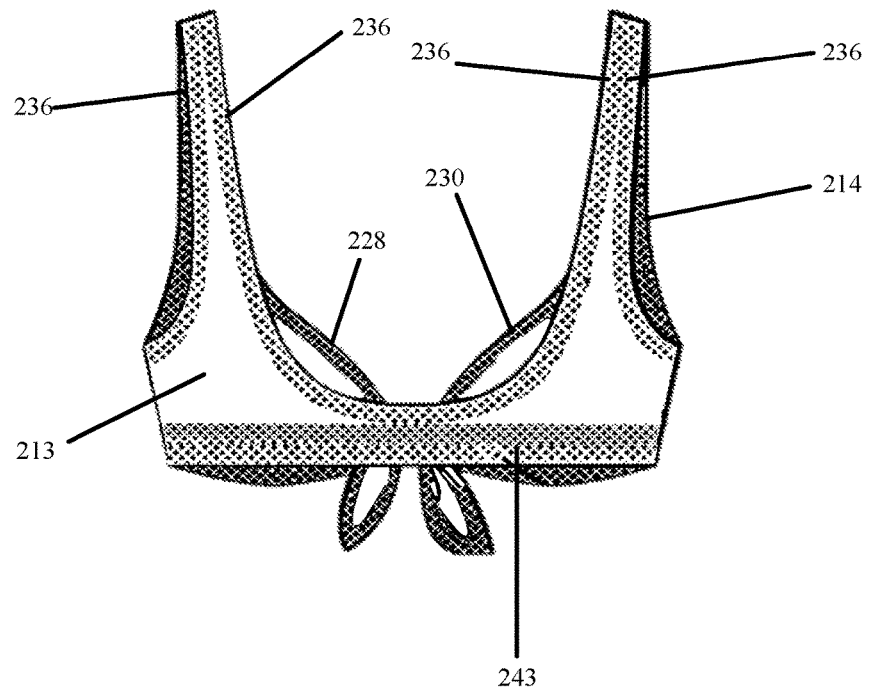
FIG. 12 shows a back, inside-out view of the third embodiment.

FIGS. 11 and 12 show front and back inside-out views of the third embodiment 210. Shoulder positioning strips 236, which may be made of silicone or another suitable material, line the edge portions 242 of the fabric 221 of the right shoulder strap 216 and the right armhole 212 on the exterior surface 239 of the inner fabric layer 213. The shoulder positioning strips 236 are configured to contact the wearer's shoulders, keep the straps in a stationary position, and reduce the likelihood that the straps will slip off of the wearer's shoulders. The swimsuit 210 includes a decorative tie 266 that fastens the right breast cup 228 to the left breast cup 229 along the medial line 228. In the embodiments shown in FIGS. 9-12, the shoulder positioning strips 236 underlie the bonded edges of the shoulder straps. In embodiments, the lower edge 241 of the exterior surface 239 of the inner fabric layer 213 includes a positioning strip 243 around the perimeter of the swimsuit 210 to help hold the swimsuit 210 in place on the wearer.

Figure 13:
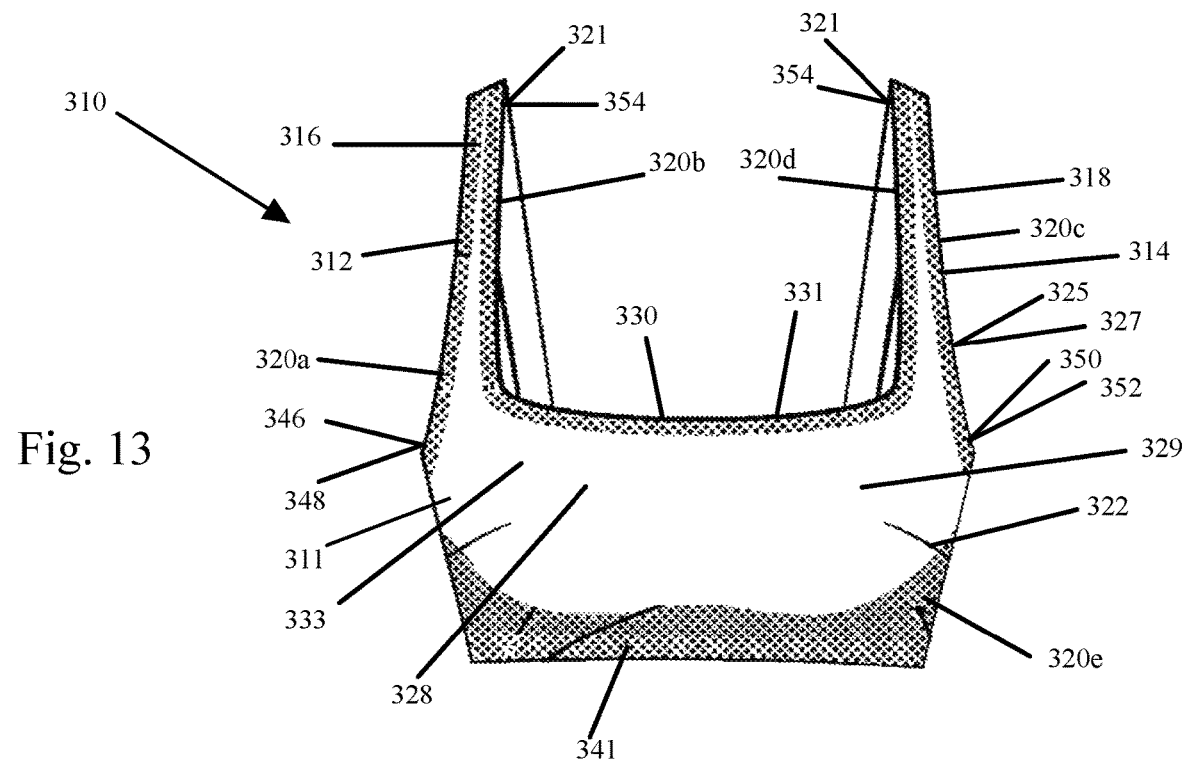
FIG. 13 shows a front, right-side-out view of a fourth embodiment.
Figure 14:
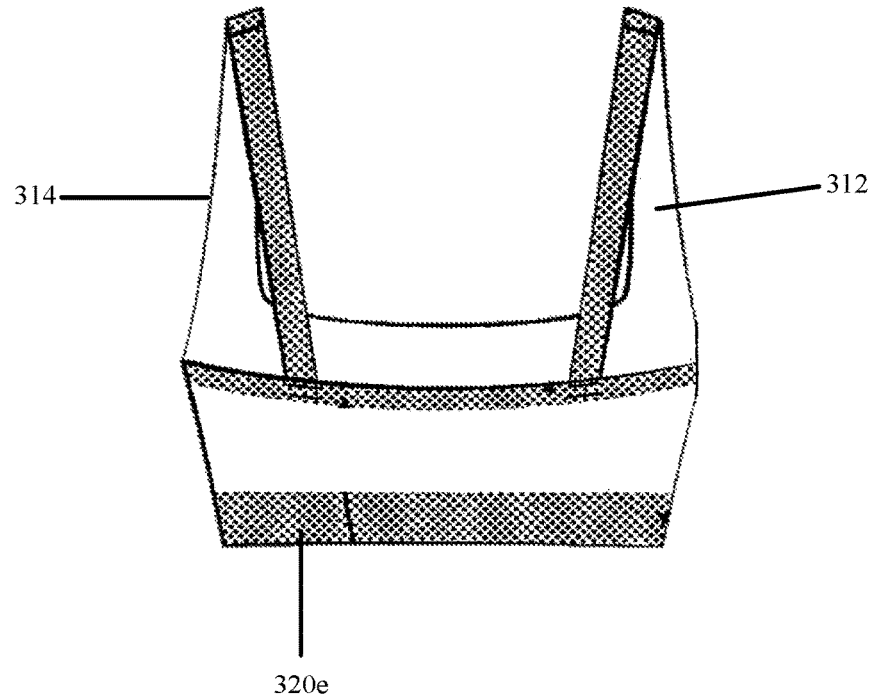
FIG. 14 shows a back, right-side-out view of the fourth embodiment.

FIGS. 13 and 14 show front and back, right-side-out views of a fourth embodiment, a bust portion of a two-piece swimsuit 310. The swimsuit 310 includes an outer fabric layer 311 and a separate inner fabric layer 313. The swimsuit 310 includes a right shoulder strap 316 forming a right armhole 312, a left shoulder strap 318 forming a left armhole 314, a right breast cup 328, a left breast cup 329, and dart-shaped stitching 322 in the lower portion of the right breast cup 328 and the left breast cup 329. The right shoulder strap 316 is lined with bonding layers 320a and 320b that connect the interior surface 325 of the inner fabric layer 313 to the interior surface 327 of the outer fabric layer 311. The bonding layer 320a completely seals and connects the edge portions 346 of the inner fabric layer 313 to the edge portions 348 of the outer fabric layer 311 of the right shoulder strap 316 and the right armhole 312. The bonding layer 320b seals and connects the edge portions 321 of the interior surface 325 of the inner fabric layer 313 to the edge portions 356 of the interior surface 327 of the outer fabric layer 311 of the right shoulder strap 316 to medial edge 330 of the right breast cup 328. The left shoulder strap 318 is lined with bonding layers 320c and 320d. The bonding layer 320c completely seals edge portions 350 of the interior surface 325 of the inner fabric layer 313 to the edge portions 352 of the interior surface 327 of the outer fabric layer of the left shoulder strap 318 and the left armhole 314. The bonding layer 320d seals and connects the edge portions 321 of the inner fabric layer 313 to the edge portions 354 of the outer fabric layer 311 of the left shoulder strap 318 to the medial edge 331 of the left breast cup 329. The bonding layer 320e beneath the bustline on the front section 333 gives the fabric increased stiffness relative to the unbonded sections, thereby reducing creasing and folding of the fabric at the locations with internal bonding layer 320. The width of the bonding 320 may be wider under the bust than along the arm holes 312 and 314 and leg holes 324 and 326 to provide extra support for the fabric beneath the bust.

Figure 15:
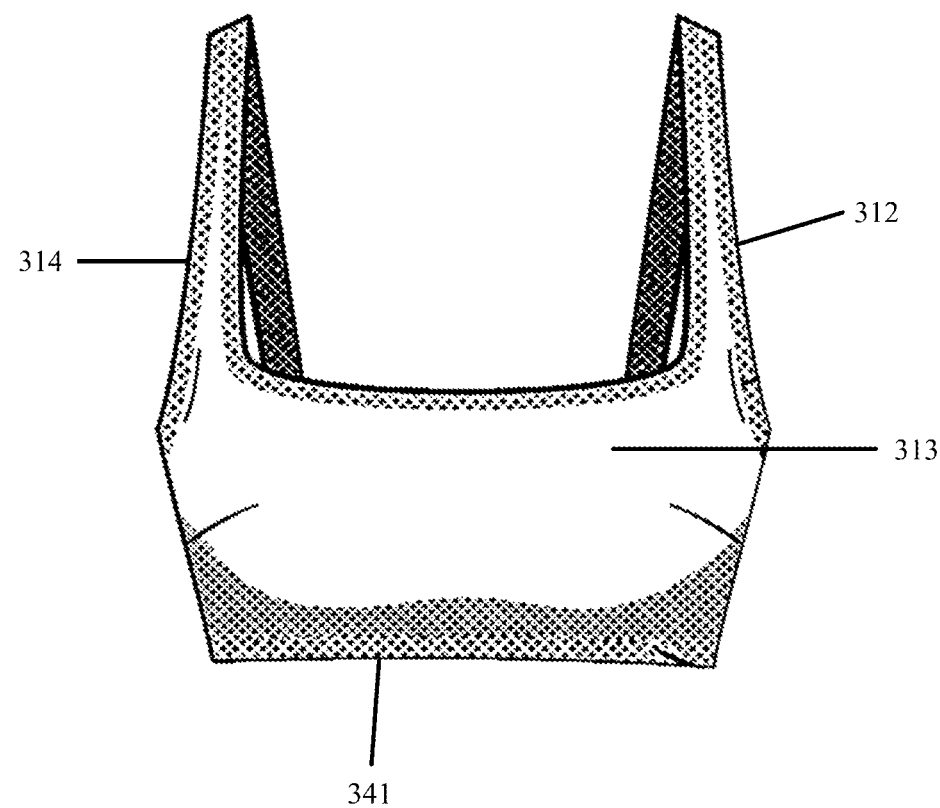
FIG. 15 shows a front, inside-out view of the fourth embodiment.
Figure 16:
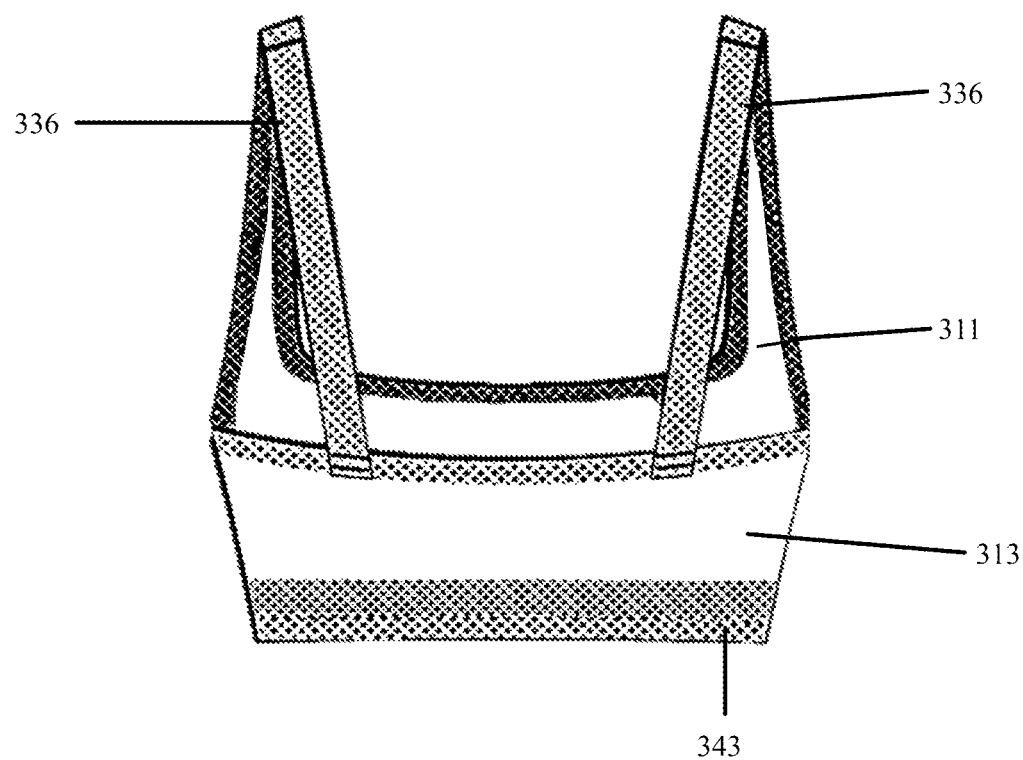
FIG. 16 shows a back, inside-out view of the fourth embodiment.

FIGS. 15 and 16 show front and back inside-out views of the fourth embodiment 310. Shoulder positioning strips 336, which may be made of silicone or another suitable material, line the edge portions 342 of the fabric 321 of the right shoulder strap 316, and the right armhole 312 on the exterior of the inner fabric layer 313. The shoulder positioning strips 336 are configured to contact the wearer's shoulders, keep the straps in a stationary position, and reduce the likelihood that the straps will slip off of the wearer's shoulders. In the embodiments shown in FIGS. 13-16 the shoulder positioning strips 336 underlie the bonded edges of the shoulder straps. In some embodiments, the lower edge 341 of the exterior surface 339 of the inner fabric layer 313 includes a positioning strip 343 around the perimeter of the swimsuit 310 to help hold the swimsuit 310 in place on the wearer.

Figure 17:
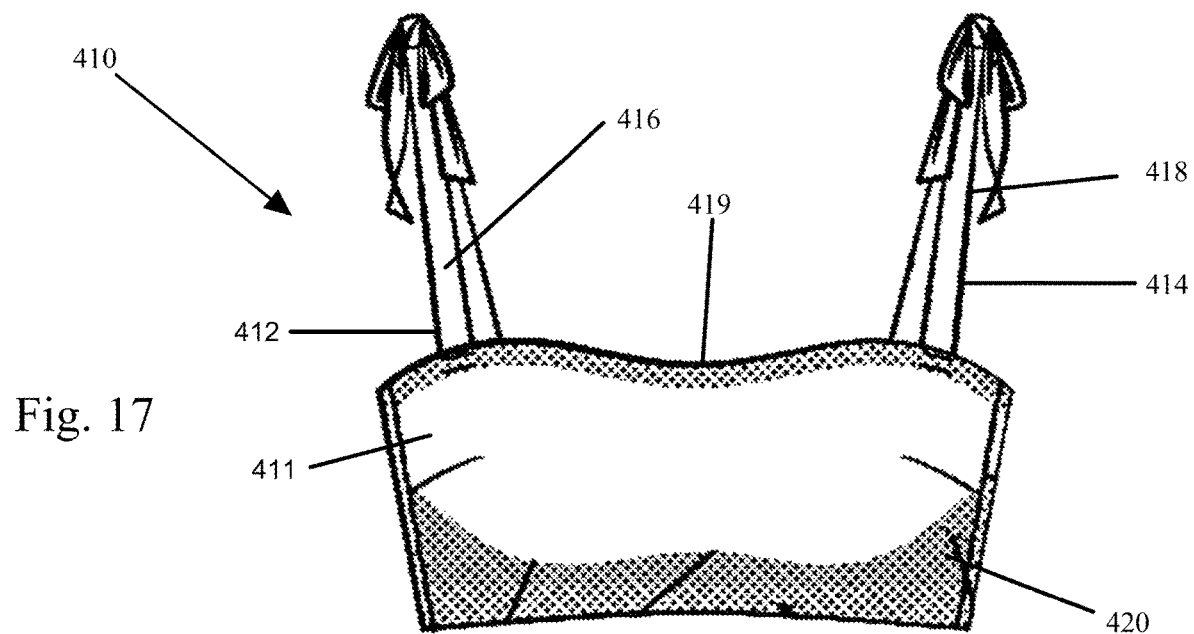
FIG. 17 shows a front, right-side-out view of a fifth embodiment.
Figure 18:
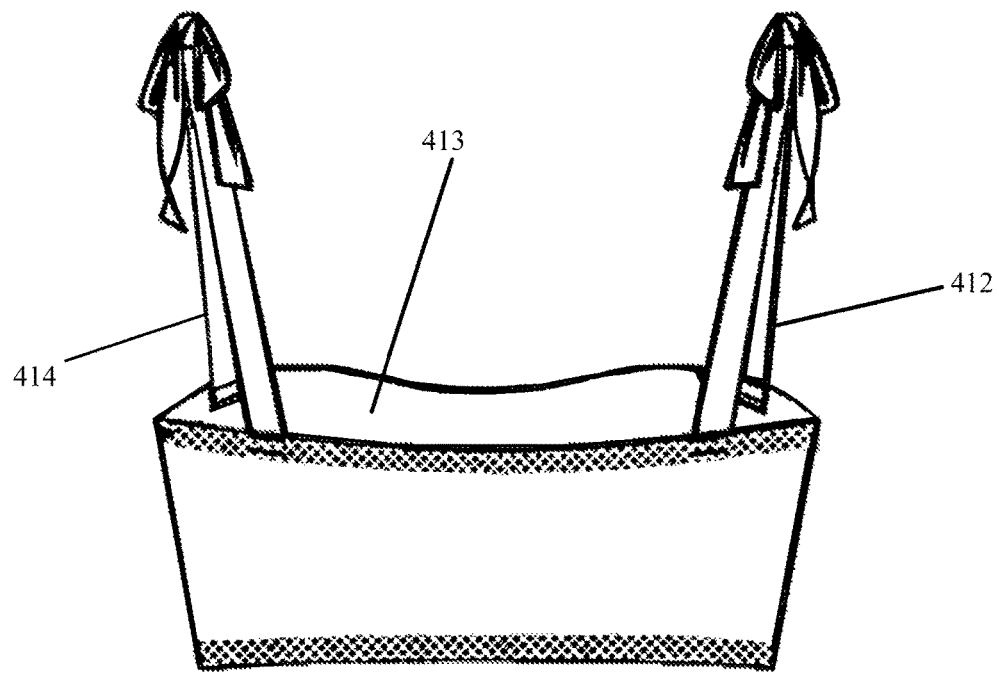
FIG. 18 shows a back, right-side-out view of the fifth embodiment.

FIGS. 17 and 18 show front and back, right-side-out views of a fifth embodiment, a bust portion of a two-piece swimsuit 410. The swimsuit 410 includes an outer fabric layer 411 and a separate inner fabric layer 413. The swimsuit 410 includes a right shoulder strap 416 forming a right armhole 412, a left shoulder strap 418 forming a left armhole 414. A bonding layer 419 is included along the upper edge portion of the swimsuit 410. The bonding layer 420 beneath the bustline gives the fabric increased stiffness relative to the unbonded sections, thereby reducing creasing and folding of the fabric at the locations with internal bonding layer 420. The width of the bonding 420 may be wider under the bust than along the armholes 412 and 414 and leg holes 424 and 426 to provide extra support for the fabric beneath the bust.

Figure 19:
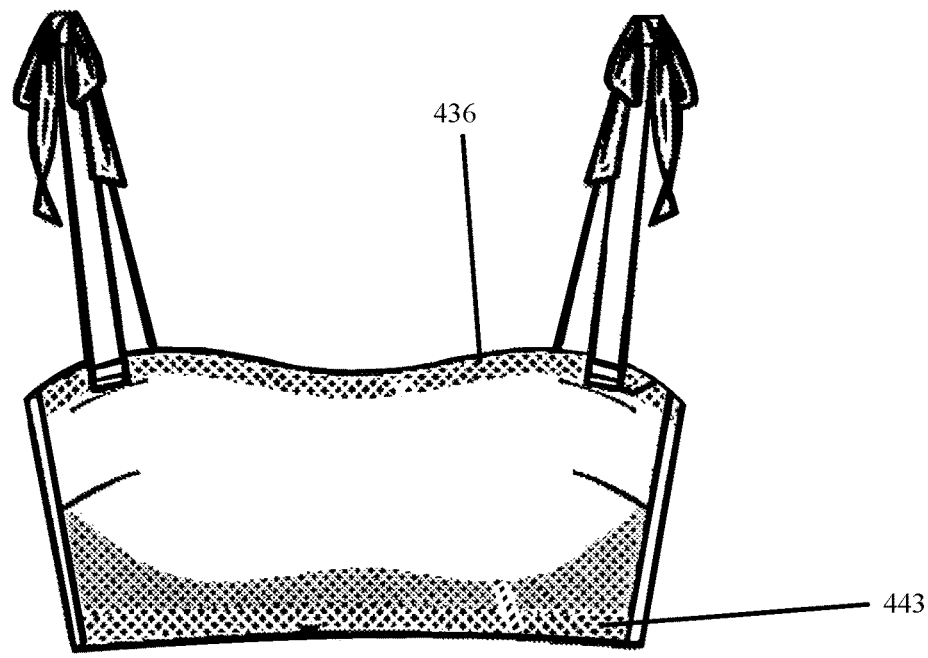
FIG. 19 shows a front, inside-out view of the fifth embodiment.
Figure 20:
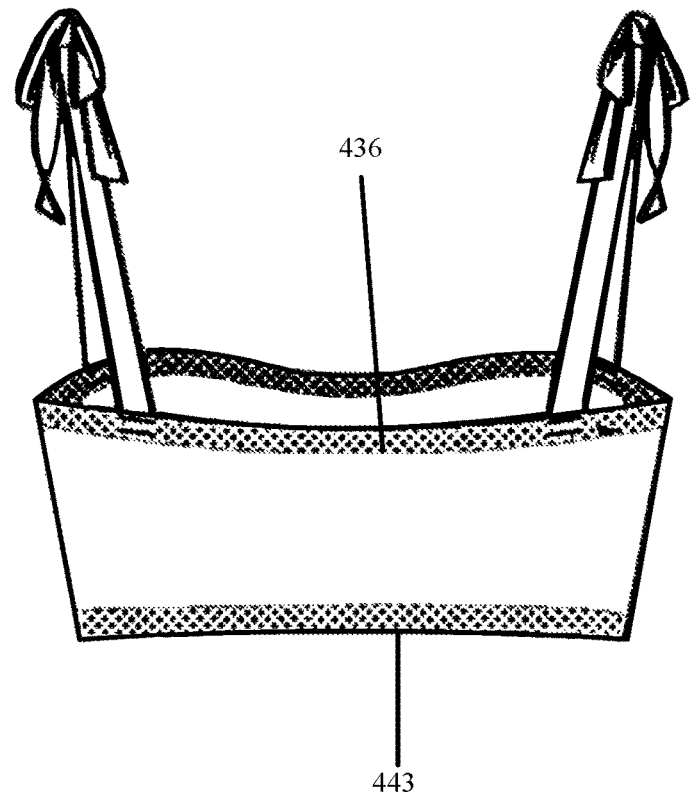
FIG. 20 shows a back, inside-out view of the fifth embodiment.

FIGS. 19 and 20 show front and back inside-out views of the fifth embodiment 410. Optional shoulder positioning strips are not shown, but are similar to those shown in other embodiments. Upper positioning strip 436 and lower positioning strip 443 help hold the swimsuit 410 in a stationary position on a wearer.

Figure 21:
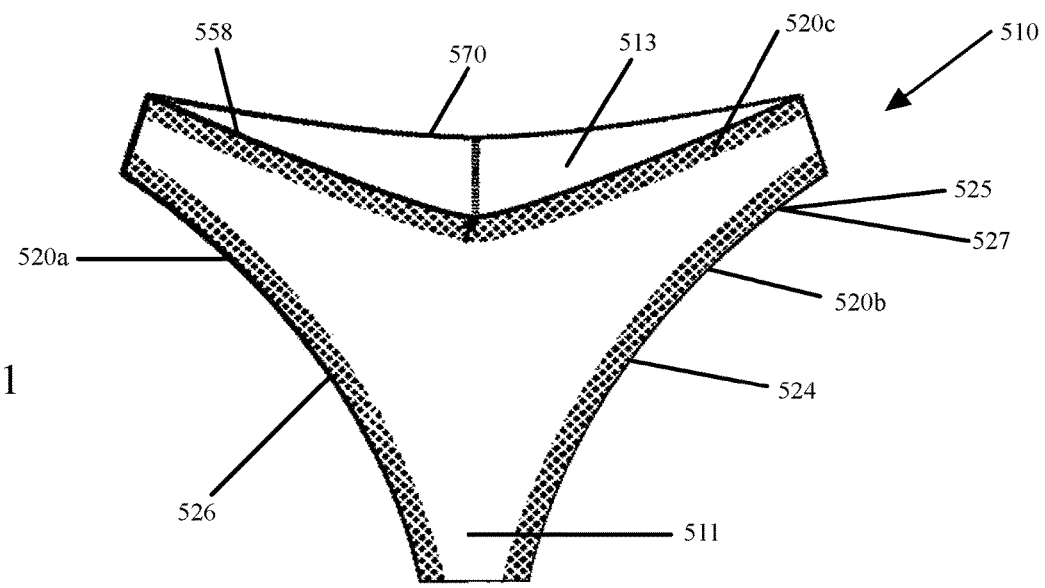
FIG. 21 shows a front, right-side-out view of a sixth embodiment.
Figure 22:
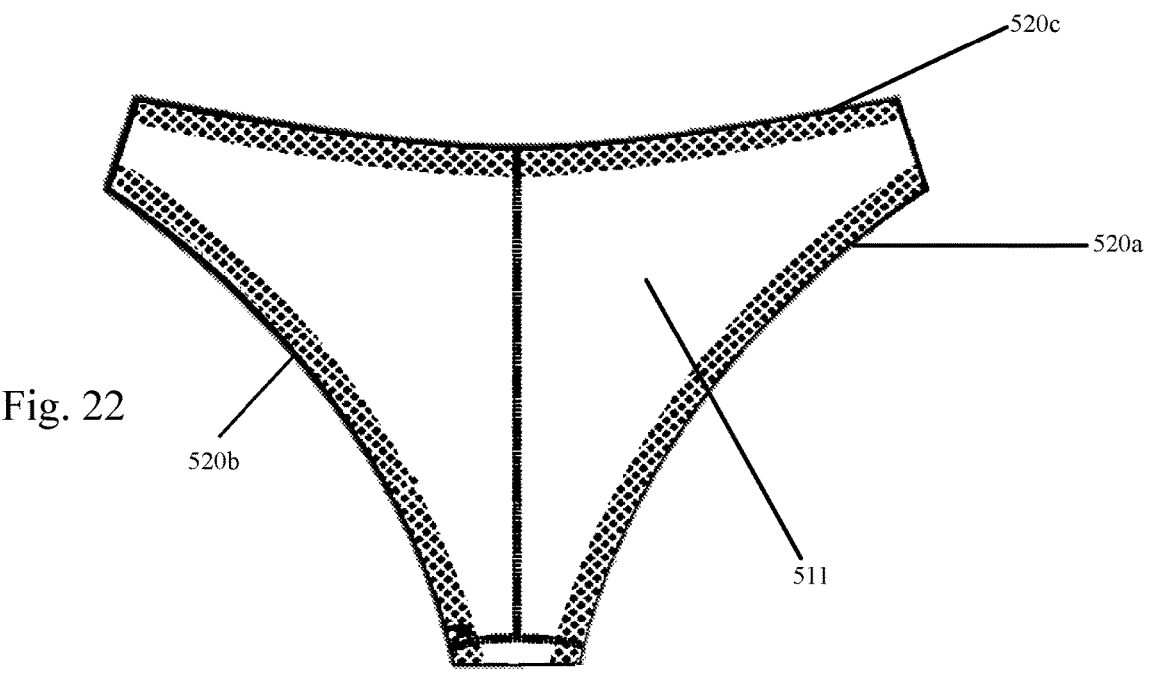
FIG. 22 shows a back, right-side-out view of the sixth embodiment.

FIGS. 21 and 22 show front and back, right-side-out views of a sixth embodiment, the bottom portion of a two-piece swimsuit, generally designated as 510. The swimsuit 510 includes a waistline opening 570 configured to surround the torso of the wearer, a right leg hole 526, and a left leg hole 524. The waistline opening 511, right leg hole 526 and the left leg hole 524 have fabric edge portions 558 that are sealed with bonding layers 520a and 520b, respectively. In the embodiment shown in FIG. 21, the bonding layers 520a and 520b comprise a thin adhesive layer disposed between the interior surface 525 of the inner fabric layer 513 and the interior surface 527 of the outer fabric layer 511. The bonding layer 520c along the waistline opening 570, and the bonding layers 520a and 520b along the right leg hole 526 and left leg hole 524, respectively give the fabric increased stiffness relative to the unbonded sections, thereby reducing creasing and folding of the fabric at the locations with the internal bonding layer.

Figure 23:
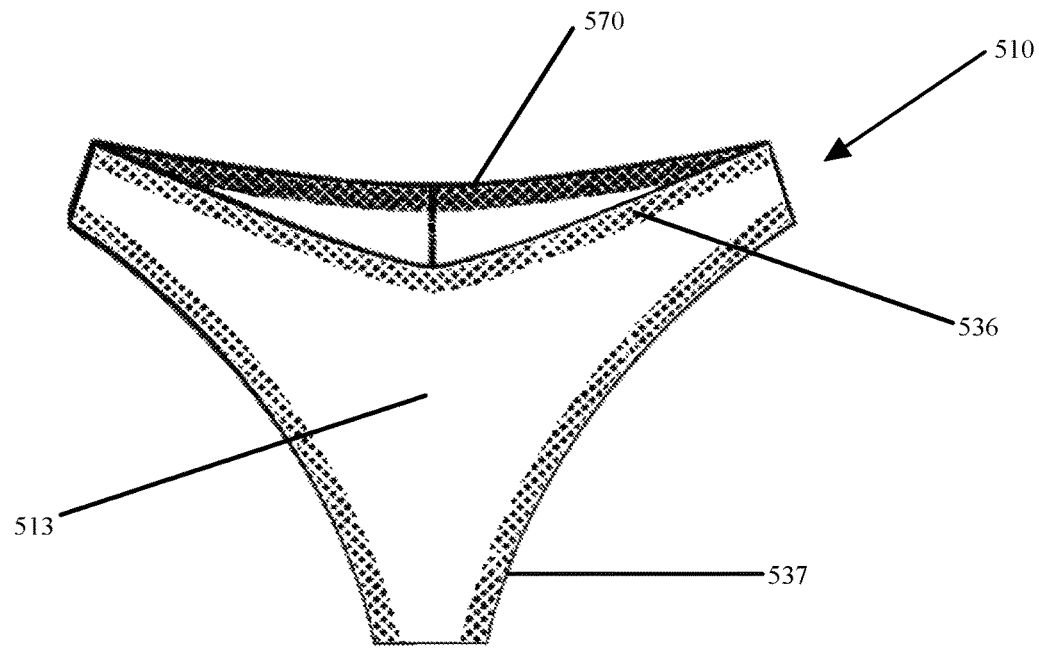
FIG. 23 shows a front, inside-out view of the sixth embodiment.
Figure 24:
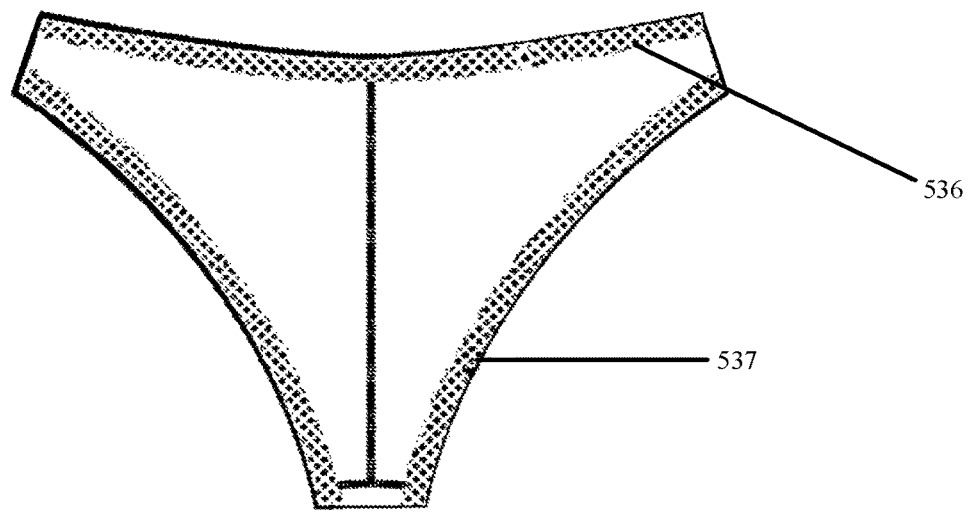
FIG. 24 shows a back, inside-out view of the sixth embodiment.

FIGS. 23 and 24 show front and back, inside-out views of the sixth embodiment, the bottom portion of a two-piece swimsuit 510. The leg positioning strips 537 help the swimsuit 510 remain in a generally stationary position on the wearer's body and reduce the likelihood that the swimsuit will ride up on the wearer's body. In the embodiments shown in FIGS. 21-24, the trunk positioning strip 536, positioned on the exterior surface of the inner fabric layer 513 underlies the bonded edge of the waistline opening 570 and the leg positioning strips 537 underlie the bonded edges of the leg holes. The trunk positioning strip 536 can be made from the same material as a leg positioning strips 537.

Figure 25:
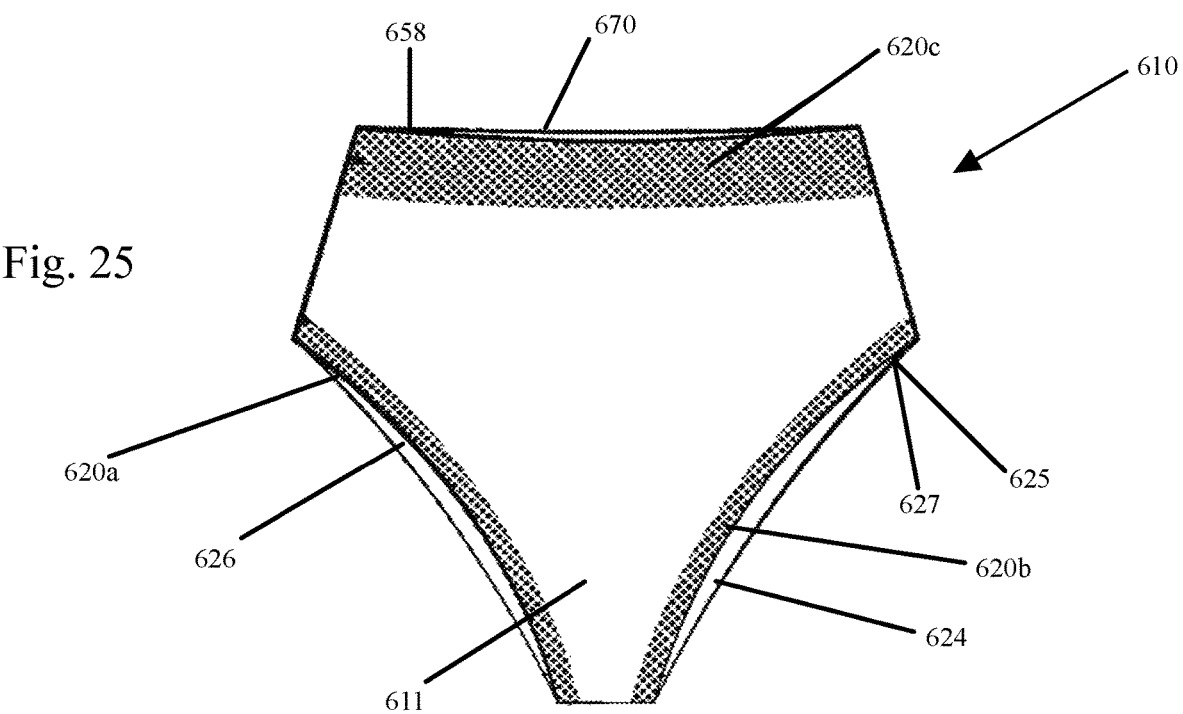
FIG. 25 shows a front, right-side-out view of a seventh embodiment.
Figure 26:
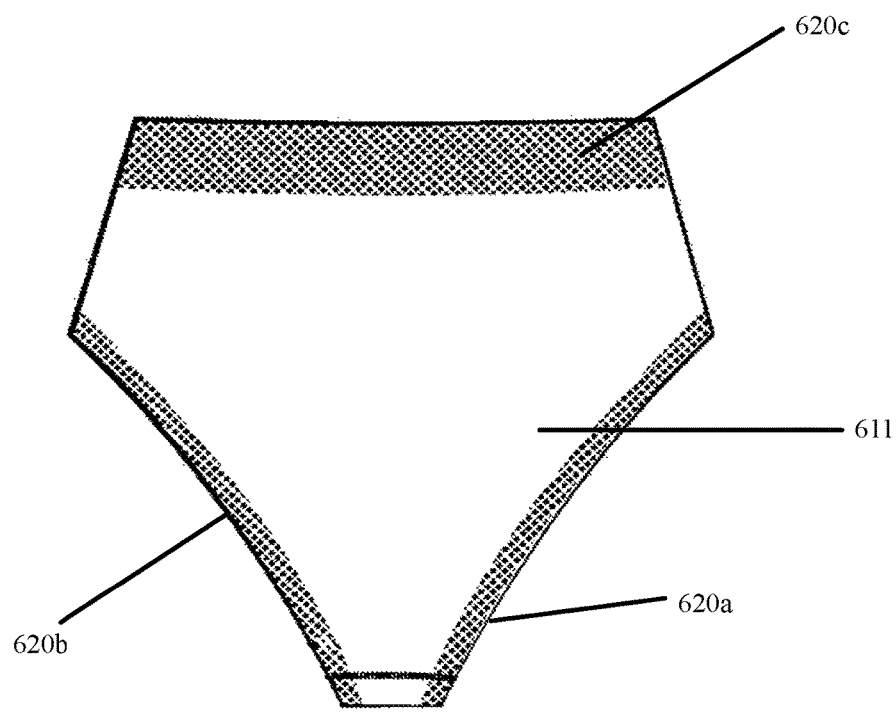
FIG. 26 shows a back, right-side-out view of the seventh embodiment.

FIGS. 25 and 26 show front and back, right-side-out views of a seventh embodiment, the bottom portion of a two-piece swimsuit 610. The swimsuit 610 has a right leg hole 626 and a left leg hole 624. The right leg hole 626 and the left leg hole 624 have fabric edges 658 that are sealed with bonding layers 620a and 620b. In the embodiment shown in FIG. 25, the bonding layers 620a and 620b are thin adhesive layers disposed between the interior surface 625 of the inner fabric layer 613 and the interior surface 627 of the outer fabric layer 611. The bonding layer 620c along the waistline 670 gives the fabric increased stiffness relative to the unbonded sections, thereby reducing creasing and folding of the fabric at the locations with internal bonding layer 620. The width of the bonding 620c may be wider at the waistline 670 than at the left leg hole 624 and the right leg hole 626 to provide extra support for the fabric.

Figure 27:
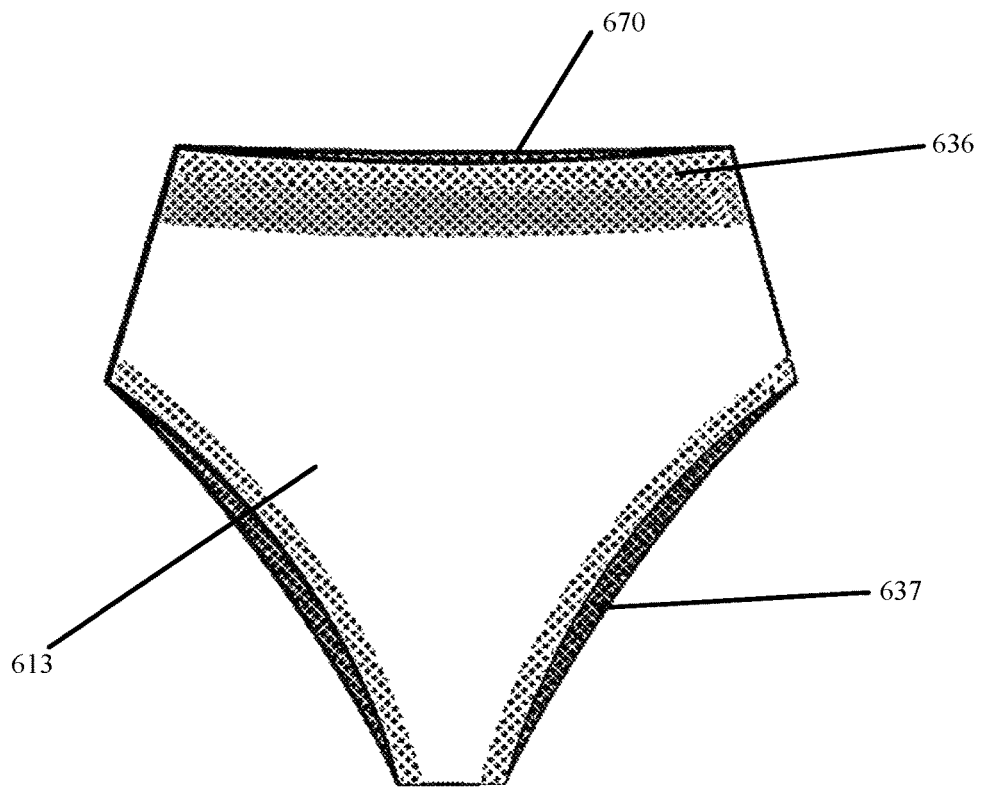
FIG. 27 shows a front, inside-out view of the seventh embodiment.
Figure 28:
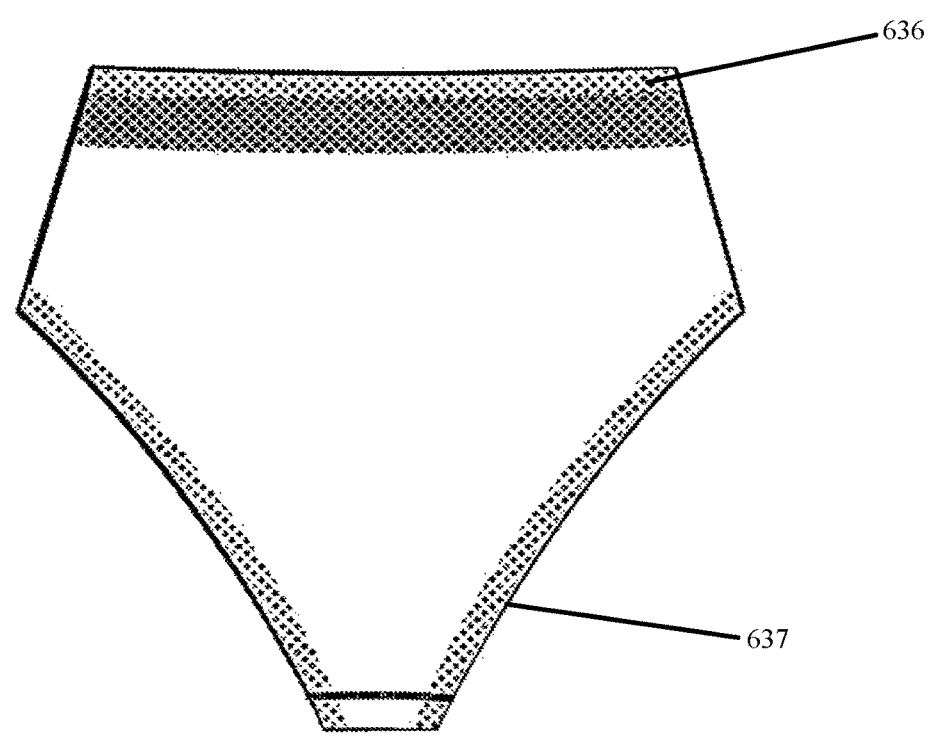
FIG. 28 shows a back, inside-out view of the seventh embodiment.

FIGS. 27 and 28 show front and back, inside-out views of the seventh embodiment, the bottom portion of a two-piece swimsuit 610. The leg positioning strips 637 help the swimsuit 610 remain in a generally stationary position on the wearer's body and reduce the likelihood that the swimsuit will ride up on the wearer's body. In the embodiments shown in FIGS. 25-28, the trunk positioning strip 636, positioned on the exterior surface of the inner fabric layer 613 underlies the bonded edge of the waistline opening 670 and the leg positioning strips 637 underlie the bonded edges of the leg holes.

Figure 29:
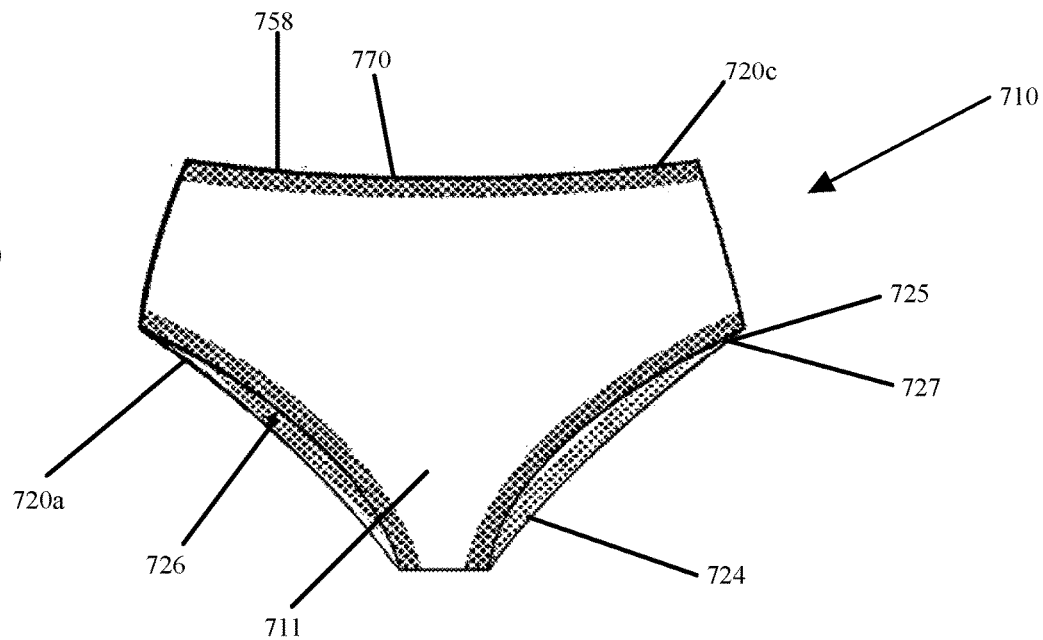
FIG. 29 shows a front, right-side-out view of an eighth embodiment.
Figure 30:
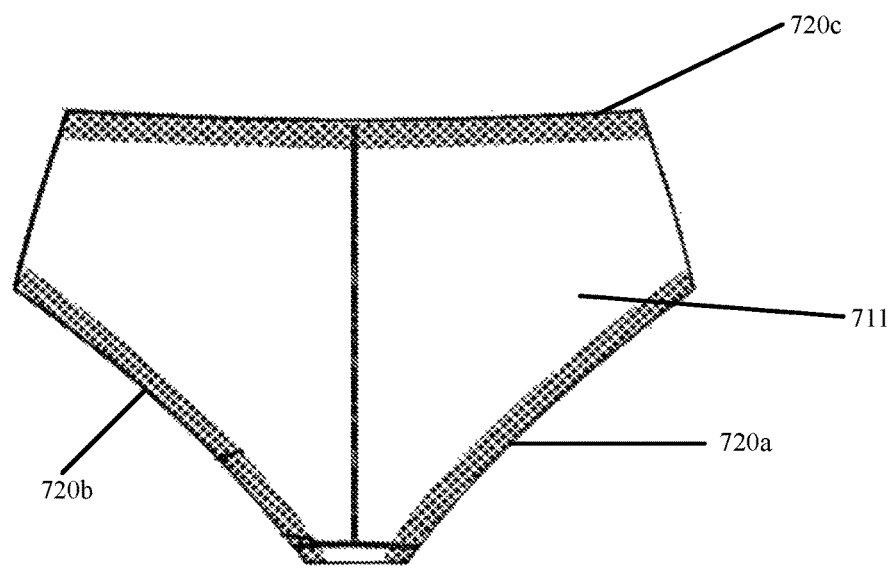
FIG. 30 shows a back, right-side-out view of the eighth embodiment.

FIGS. 29 and 30 show front and back, right-side-out views of an eighth embodiment, the bottom portion of a two-piece swimsuit 710. The swimsuit 710 has a right leg hole 726 and a left leg hole 724. The right leg hole 726 and the left leg hole 724 have fabric edge portions 758 that are sealed with bonding layers 720a and 720b. In the embodiment shown in FIG. 29, the bonding layers 720a and 720b are thin adhesive layers disposed between the interior surface 725 of the inner fabric layer 713 and the interior surface 727 of the outer fabric layer 711. The bonding layer 720 along the waistline 770 and right leg hole 726 and left leg hole 724 gives the fabric increased stiffness relative to the unbonded sections, thereby reducing creasing and folding of the fabric at the locations with the internal bonding layer.

Figure 31:
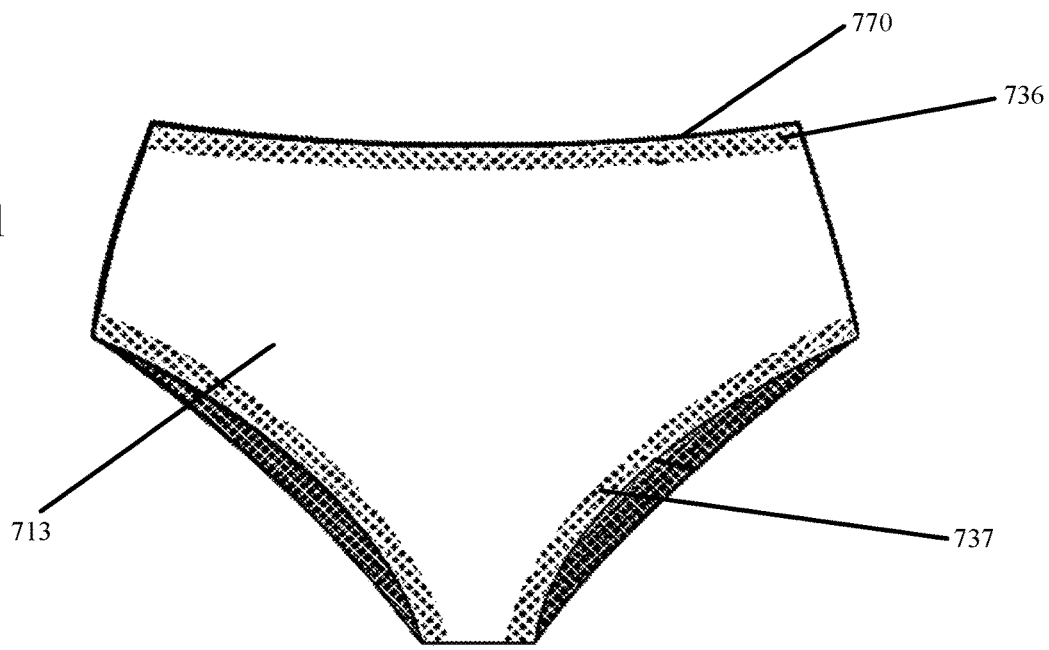
FIG. 31 shows a front, inside-out view of the eighth embodiment.
Figure 32:
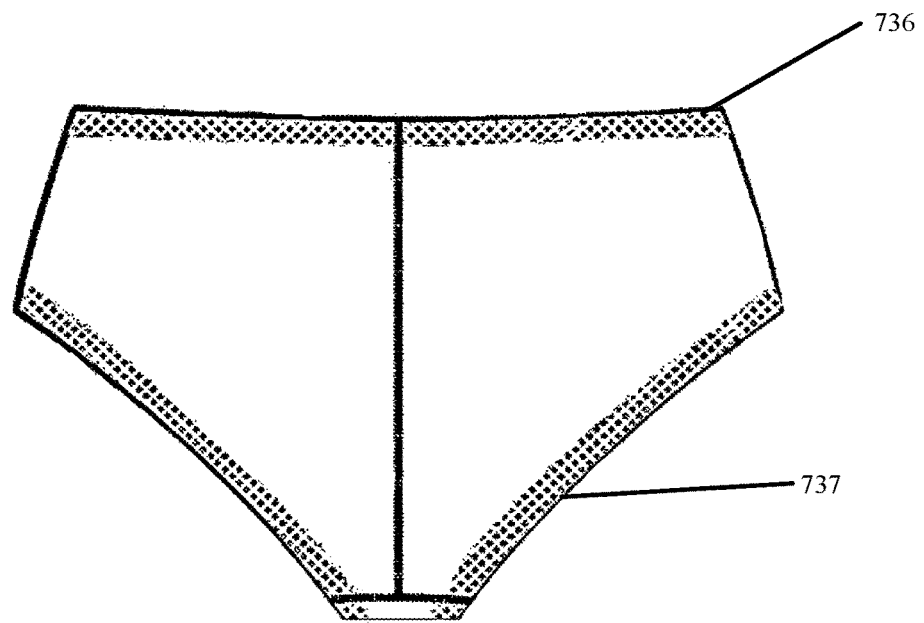
FIG. 32 shows a back, inside-out view of the eighth embodiment.

FIGS. 31 and 32 show front and back, inside-out views of the eighth embodiment, the bottom portion of a two-piece swimsuit 710. The leg positioning strips 737 help the swimsuit 710 remain in a generally stationary position on the wearer's body and reduce the likelihood that the swimsuit will ride up on the wearer's body. In the embodiments shown in FIGS. 29-32, the trunk positioning strip 736, positioned on the exterior surface of the inner fabric layer 713 underlies the bonded edge of the waistline opening 770 and the leg positioning strips 737 underlie the bonded edges of the leg holes.

Figure 33:
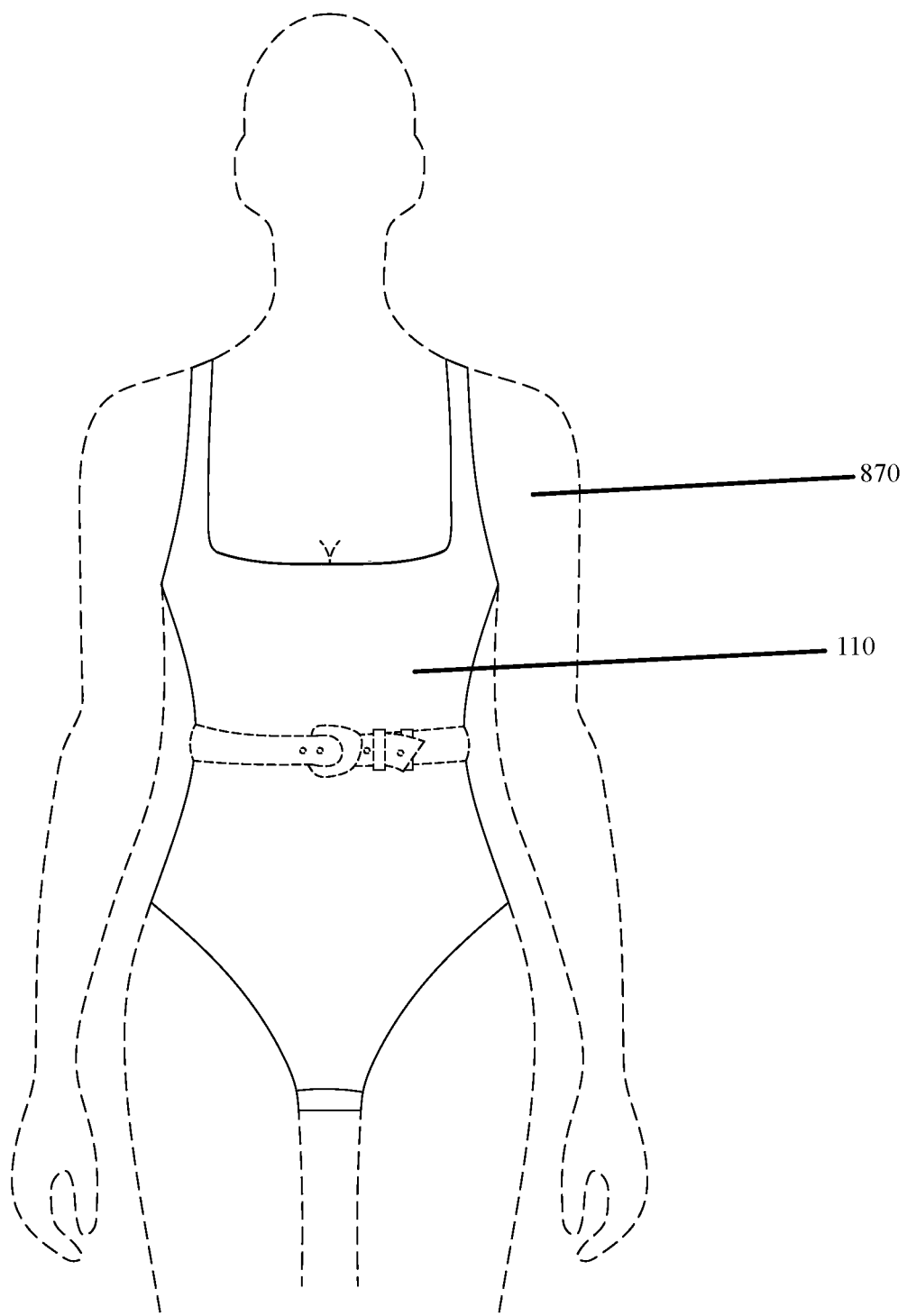
FIG. 33 shows a front view of the second embodiment shown on a wearer.
Figure 34:
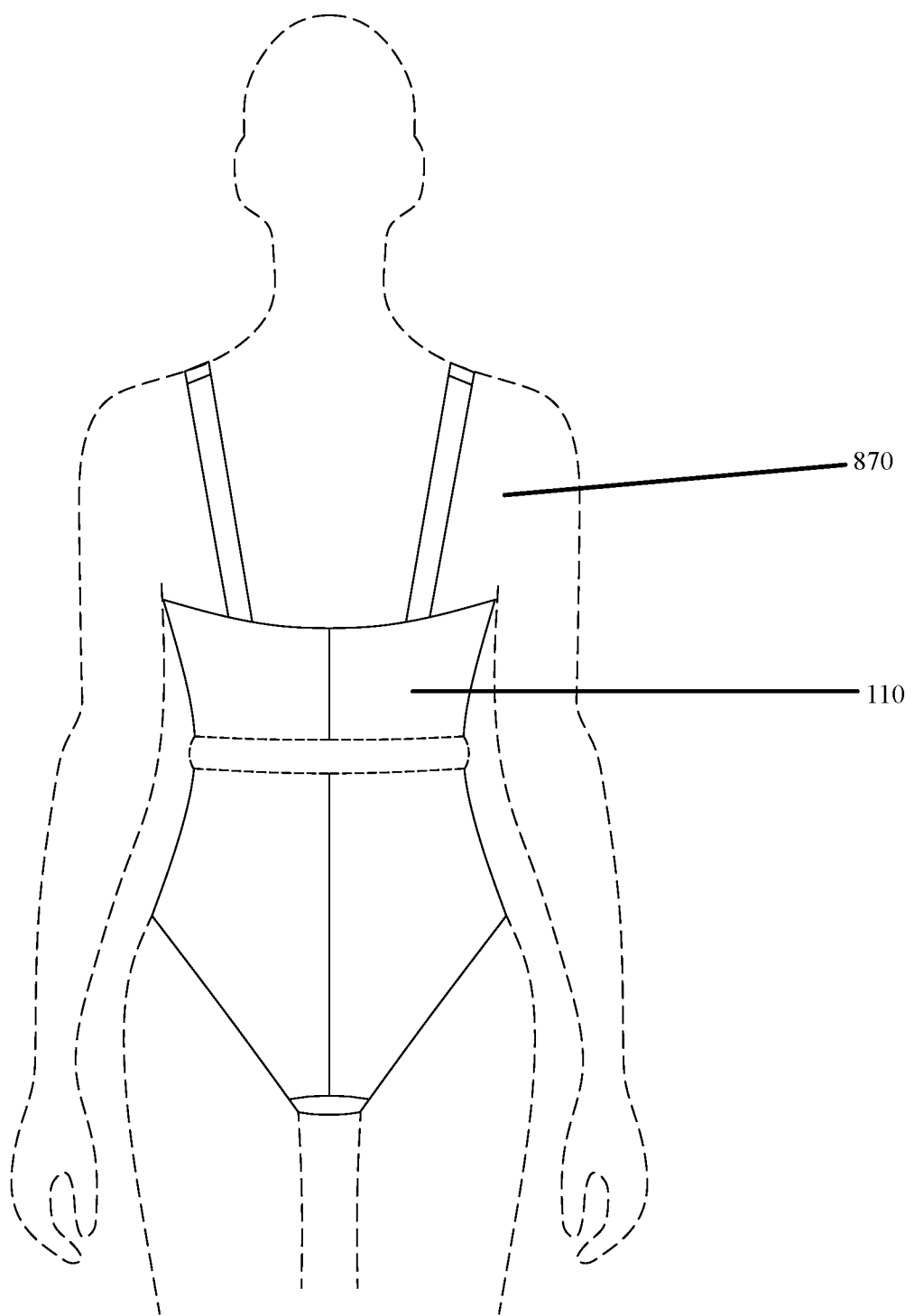
FIG. 34 shows a back view of the second embodiment shown on a wearer.
Figure 35:
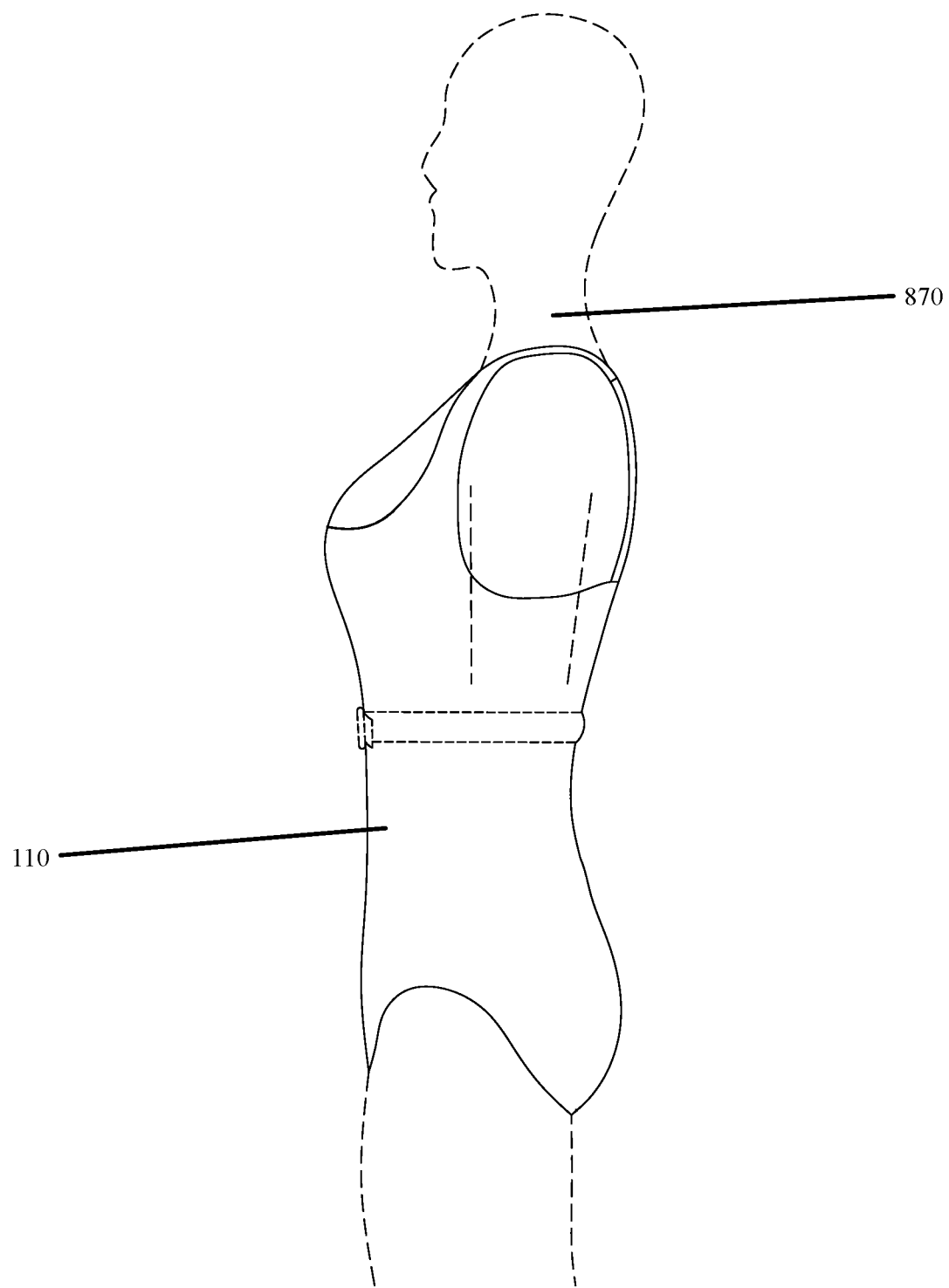
FIG. 35 shows a side view of the second embodiment shown on a wearer.

FIG. 33 shows a front view of the second embodiment 110 shown on a wearer 870. FIG. 34 shows a back view of the second embodiment 110 shown on a wearer 870. FIG. 35 shows a side view of the second embodiment 110 shown on a wearer 870. As is shown in these figures, the swimsuit does not cut into the skin of the wearer but instead has smooth contact with the wearer's body.

The swimsuit is manufactured by obtaining a first fabric for the inner layer and a second fabric for the outer layer, raw cutting the fabric to the appropriate size and shape, preferably using a laser cutter, and assembling the swimsuit. The inner and outer layers of fabric are bonded to one another beneath the bustline or waistline and along all of the edges. Positioning strips are adhered on the inner side along edges.

In a preferred embodiment, the swimsuit is made from a knit fabric, usually a synthetic knit fabric. In embodiments, the fabric comprises a thermoplastic polymer and/or a thermosetting polymer. In some cases, the fabric comprises a nylon and polyurethane blend. In embodiments, the polyurethane is spandex. In one embodiment, each of the inner fabric layer and the outer fabric layer comprises about 80 wt. % nylon and about 20 wt. % spandex. The swimsuit fabric is a stretchy material that allows for a comfortable fit. The fabric is also quick drying and water-resistant. The swimsuit may be made from UV-resistant and chlorine-resistant fabric. The swimsuit may also be made from polyester and elastane. In some cases, the inner layer of fabric and the outer layer of fabric are made from the same type of material, and the material of the inner layer can be of the same density as the material of the outer layer, or can be more or less dense than the material of the outer layer. In other cases, the inner layer of fabric and the outer layer of fabric are made from different types of material.

In a preferred embodiment, the thickness of the bonding material is about 0.5 mm to about 5 mm, or about 0.5 mm to about 4 mm, or about 0.5 mm to about 3 mm. The width of the bonding material around the edges of the swimsuit is about 5 mm to about 65 mm, or about 8 mm to about 55 mm, or about 10 mm to about 50 mm. The purpose of the bonding material is to give the fabric increased stiffness relative to the unbonded sections, thereby reducing creasing and folding of the fabric at the locations with the bonding layer.

The thickness of the positioning strips in a direction perpendicular to the plane of the fabric is about 0.3 mm to about 1 mm, or about 0.5 mm to about 1 mm. The width of the positioning strips in a direction parallel to the plane of the fabric is about 6 mm to about 25 mm, or about 7 mm to about 20 mm, or about 8 mm to about 18 mm.

As indicated above, the swimsuit is made from an inner layer of fabric and an outer layer of fabric. In embodiments, the inner layer has a fabric weight of 110 gsm to 180 gsm, or 130 gsm to 170 gsm, or 150 gsm to 170 gsm. The outer layer of fabric has a fabric weight of 190 gsm to 260 gsm, or 200 gsm to 240 gsm, or 200 gsm to 220 gsm. In some cases, the fabric is bonded together using an adhesive applied between the inner and outer layer of fabric. The fabric may be bonded along the edges of the swimsuit and under the bust.

A number of alternatives, modifications, variations, or improvements therein may be subsequently made by those skilled in the art, which are also intended to be encompassed by the following claims.

What is claimed is:

1. A swimsuit comprising:
a bust portion comprising an inner fabric layer including an interior surface and an exterior surface, and an outer fabric layer including an interior surface and an exterior surface, the bust portion including a left shoulder strap, a right shoulder strap, a central portion, and a lower end portion, the left shoulder strap and central portion defining a left arm opening, and the right shoulder strap and central portion defining a right arm opening, the left shoulder strap and the right shoulder strap being raw cut without folded edges or stitching when assembled and being bonded with a bonding layer between the interior surface of the inner fabric layer and the interior surface of the outer fabric layer,
a bottom portion, including a waist portion configured to surround a torso, with an inner fabric layer including an interior surface and an exterior surface, and an outer fabric layer including an interior surface and an exterior surface, a left leg opening defined by a lower left edge portion, and a right leg opening defined by a lower right edge portion, the lower left edge portion and lower right edge portion being raw cut without folded edges or stitching when assembled and being bonded with a bonding layer between the interior surface of the inner fabric layer and the interior surface of the outer fabric layer along the left leg opening and the right leg opening, and
a first positioning strip and a second positioning strip adhered to the exterior surface of the inner fabric layer of the bust portion, extending along substantially an entire perimeter of an edge portion of the right arm opening and an edge portion of the left arm opening, respectively,
a third positioning strip and a fourth positioning strip adhered to the exterior surface of the inner fabric layer of the bottom portion, extending along substantially an entire perimeter of the left leg opening and the right leg opening, respectively,
each of the first positioning strip, the second positioning strip, the third positioning strip and the fourth positioning strip having a thickness in the range of 0.3 mm to 1 mm, and a width in the range of 6 mm to 18 mm, and consisting of one layer of one thermoplastic material or one layer of one thermoset material, the one layer being semi-tacky and configured to removably cling to the wearer's skin and further configured to position the swimsuit on the wearer's skin and prevent the swimsuit from slipping out of position with respect to the wearer's skin, and
wherein the bonding layer which bonds the outer fabric layer of the bust portion to the inner fabric layer of the bust portion, and the bonding layer which bonds the outer fabric layer of the bottom portion to the inner fabric layer of the bottom portion, are only present at raw cut edges, including the lower left edge portion and the lower right edge portion of the bottom portion, the lower end portion of the bust portion, the edge portion of the right arm opening and the edge portion of the left arm opening and do not extend continuously throughout the swimsuit.

2. The swimsuit of claim 1, wherein the outer fabric layer of the bust portion and the outer fabric layer of the bottom portion comprise a UV-resistant, chlorine-resistant fabric.

3. The swimsuit of claim 1, wherein all edge portions are raw cut.

4. The swimsuit of claim 1, wherein the inner fabric layer of the bust portion and the inner fabric layer of the bottom portion have a fabric weight of 110 gsm to 180 gsm, and the outer fabric layer of the bust portion and the outer fabric layer of the bottom portion have a fabric weight of 190 gsm to 260 gsm.

5. The swimsuit of claim 1, wherein all edge portions are seamless.

6. The swimsuit of claim 1, wherein the bonding layers of both the bust portion and the bottom portion comprise an adhesive.

7. The swimsuit of claim 1, wherein the inner fabric layer and the outer fabric layer of the bust portion and the bottom portion comprise about 80% nylon and about 20% spandex.

8. The swimsuit of claim 1, wherein all edge portions of the swimsuit are raw cut, the bonding layer of the bust portion and bonding layer of the bottom portion comprise an adhesive, the outer fabric layer of the bust portion and the outer fabric layer of the bottom portion comprise a UV-resistant, chlorine-resistant fabric, the inner fabric layer of the bust portion and the inner fabric layer of the bottom portion have a fabric weight of 110 gsm to 180 gsm, and the outer fabric layer of the bust portion and the outer fabric layer of the bottom portion have a fabric weight of 190 gsm to 260 gsm.

9. A one-piece swimsuit comprising:
 a bust portion comprising an inner fabric layer including an interior surface and an exterior surface, and an outer fabric layer including an interior surface and an exterior surface, the bust portion including a left shoulder strap, a right shoulder strap, a central portion, and a lower end portion, the left shoulder strap and central portion defining a left arm opening, and the right shoulder strap and central portion defining a right arm opening, the left shoulder strap and right shoulder strap being raw cut without folded edges or stitching when assembled and being bonded with a bonding layer between the interior surface of the inner fabric layer and the interior surface of the outer fabric layer, the lower end portion including an internal bonding layer between the interior surface of the inner fabric layer and the interior surface of the outer fabric layer,
 a bottom portion connected to the bust portion, the bottom portion including a waist portion configured to surround a torso, with an inner fabric layer including an interior surface and an exterior surface, and an outer fabric layer including an interior surface and an exterior surface, a left leg opening defined by a lower left edge portion, and a right leg opening defined by a lower right edge portion, the lower left edge portion and lower right edge portion being raw cut without folded edges or stitching when assembled and being bonded with a bonding layer between the interior surface of the inner fabric layer and the interior surface of the outer fabric layer along the left leg opening and the right leg opening,
 a first positioning strip and a second positioning strip adhered to the exterior surface of the inner fabric layer and extending along substantially an entire perimeter of an edge portion of the right arm opening and an edge portion of the left arm opening, respectively,
 a third positioning strip and a fourth positioning strip adhered to the exterior surface of the inner fabric layer of the bottom portion, extending along substantially an entire perimeter of the lower left edge portion and the lower right edge portion, respectively,
 each of the first positioning strip, the second positioning strip, the third positioning strip, and the fourth positioning strip having a thickness of 0.3 mm to 1 mm and a width of 6 mm to 18 mm, and consisting of one layer of one thermoplastic material or one layer of one thermoset material, the one layer being semi-tacky and being configured to removably cling to the wearer's skin and further configured to position the swimsuit on the wearer's skin and prevent the swimsuit from slipping out of position with respect to the wearer's skin, and
 wherein the bonding layer which bonds the outer fabric layer of the bottom portion to the inner fabric layer of the bottom portion is only present at the lower left edge portion and lower right edge portion of the bottom portion and does not extend continuously throughout the bottom portion.

10. The swimsuit of claim 9, wherein the bonding layers of both the bust portion and the bottom portion comprise an adhesive.

11. The swimsuit of claim 9, wherein the inner fabric layer and the outer fabric layer of the bust portion and the bottom portion comprise about 80% nylon and about 20% spandex.

12. The one-piece swimsuit of claim 9, wherein all edge portions of the swimsuit are raw cut, the bonding layer of the bottom portion comprises an adhesive, the outer fabric layer of the bust portion and the outer fabric layer of the bottom portion comprise a UV-resistant, chlorine-resistant fabric, the inner fabric layer of the bust portion and the inner fabric layer of the bottom portion have a fabric weight of 110 gsm to 180 gsm, the outer fabric layer of the bust portion and the outer fabric layer of the bottom portion have a fabric weight of 190 gsm to 260 gsm, and the internal bonding layer on the lower end portion of the bust portion provides increased stiffness relative to an unbonded portion of the bust portion.

13. A two-piece swimsuit comprising:
 a bust portion comprising an upper edge portion, a central portion and a lower edge portion, an inner fabric layer including an interior surface and an exterior surface, and an outer fabric layer including an interior surface and an exterior surface, the upper edge portion and the lower edge portion being raw cut without folded edges or stitching when assembled and being bonded with a bonding layer between the interior surface of the inner fabric layer and the interior surface of the outer fabric layer,
 a bottom portion, including a waist portion comprising a waist edge portion configured to surround a torso, with an inner fabric layer including an interior surface and an exterior surface, and an outer fabric layer including an interior surface and an exterior surface, a left leg opening defined by a lower left edge portion, and a right leg opening defined by a lower right edge portion, the lower left edge portion, the lower right edge portion, and the waist edge portion being raw cut without folded edges or stitching when assembled and being bonded with a bonding layer between the interior surface of the inner fabric layer and the interior surface of the outer fabric layer, a first positioning strip adhered to the exterior surface of the inner fabric layer of the bust portion extending along substantially an entire perimeter of the upper edge portion of the bust portion and a second positioning strip adhered to the exterior surface of the inner fabric layer of the bust portion extending along substantially an entire perimeter of the lower edge portion of the bust portion, a third positioning strip adhered to the exterior surface of the inner fabric layer of the bottom portion and extending along substantially an entire perimeter of the lower left edge portion of the bottom portion, a fourth positioning strip adhered to the exterior surface of the inner fabric layer of the bottom portion and extending along substantially an entire perimeter of the lower right edge portion of the bottom portion, and a fifth positioning strip adhered to the exterior surface of the inner fabric layer of the bottom portion extending along substantially an entire perimeter of the waist edge portion of the bottom portion, the first positioning strip, the second positioning strip, the third positioning strip, the fourth positioning strip and the fifth positioning strip each having a thickness in the range of 0.3 mm to 1 mm, and a width in the range of 6 mm to 18 mm, and consisting of one layer of one thermoplastic material or one layer of one thermoset material, the one layer being configured to removably cling to the wearer's skin and further configured to position the swimsuit on the wearer's skin and prevent the swimsuit from slipping out of position with respect to the wearer's skin, and wherein the bonding layer which bonds the outer fabric layer of the bust portion to the inner fabric layer of the bust portion, and the bonding layer which bonds the outer fabric layer of the bottom portion to the inner fabric layer of the bottom portion, are only present raw cut edges, including the upper edge portion and the lower edge portion of the bust portion, the waist edge portion, the lower left edge portion and the lower right edge portion of the bottom portion and do not extend continuously throughout the swimsuit.

14. The swimsuit of claim 13, wherein the bonding layers of both the bust portion and the bottom portion comprise an adhesive.

15. The two-piece swimsuit of claim 13, wherein all edge portions of the swimsuit are raw cut, the bonding layer of the bust portion and the bonding layer of the bottom portion comprise an adhesive, the outer fabric layer of the bust portion and the outer fabric layer of the bottom portion comprise a UV-resistant, chlorine-resistant fabric, the inner fabric layer of the bust portion and the inner fabric layer of the bottom portion have a fabric weight of 110 gsm to 180 gsm, and the outer fabric layer of the bust portion and the outer fabric layer of the bottom portion have a fabric weight of 190 gsm to 260 gsm.

16. A method of making a swimsuit, comprising:

obtaining a first fabric for use in forming an inner layer of the swimsuit and a second fabric for use in forming an outer layer of the swimsuit, raw cutting the first fabric and the second fabric to the appropriate size and shape for the swimsuit, forming a first raw cut fabric segment and a second raw cut fabric segment each having raw cut edges which do not include folded edges or stitching, bonding the first raw cut fabric segment to the second raw cut fabric segment with an adhesive along the raw cut edges, the adhesive forming a bonding layer which bonds the first raw cut fabric segment to the second raw cut fabric segment only along the raw cut edges of the swimsuit, such that the bonding layer does not extend continuously throughout the swimsuit, adhering a plurality of positioning strips extending along substantially an entire perimeter of an exterior surface of the inner layer of each of the raw cut edges, each positioning strip having a thickness of 0.3 mm to 1 mm and a width of 6 mm to 18 mm, and consisting of one layer of one thermoplastic material or one layer of one thermoset material, the one layer being semi-tacky and configured to removably cling to the wearer's skin and further configured to position the swimsuit on the wearer's skin and prevent the swimsuit from slipping out of position with respect to the wearer's skin, and the swimsuit being finished while maintaining raw cut edges which do not include folded edges or stitching.

17. The method of claim 16, wherein all edges of the swimsuit configured to touch a wearer's skin comprise raw cut fabric.

* * * * *